(12) United States Patent
Isgar

(10) Patent No.: US 11,983,728 B2
(45) Date of Patent: *May 14, 2024

(54) OPINION AGGREGATION SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,966

(22) Filed: Dec. 19, 2022

(65) Prior Publication Data
US 2023/0121476 A1 Apr. 20, 2023

Related U.S. Application Data

(63) Continuation of application No. 16/894,199, filed on Jun. 5, 2020, now Pat. No. 11,531,999.

(60) Provisional application No. 62/863,783, filed on Jun. 19, 2019.

(51) Int. Cl.
*G06F 3/0482* (2013.01)
*G06N 20/00* (2019.01)
*G06Q 30/0203* (2023.01)

(52) U.S. Cl.
CPC ....... *G06Q 30/0203* (2013.01); *G06F 3/0482* (2013.01); *G06N 20/00* (2019.01)

(58) Field of Classification Search
CPC ... G06Q 30/0203; G06N 20/00; G06F 3/0482
See application file for complete search history.

(56) References Cited

U.S. PATENT DOCUMENTS

| | | | | |
|---|---|---|---|---|
| 8,732,605 B1 * | 5/2014 | Falaki | ............... | G06Q 30/02 |
| | | | | 715/780 |
| 10,997,665 B2 * | 5/2021 | Neag | ............... | G06F 3/0482 |
| 2004/0235460 A1 * | 11/2004 | Engstrom | ......... | H04H 60/33 |
| | | | | 455/414.3 |
| 2006/0026256 A1 * | 2/2006 | Diddee | ............... | H04L 51/04 |
| | | | | 709/207 |
| 2009/0164266 A1 * | 6/2009 | Lakhani | ............ | G06Q 30/02 |
| | | | | 705/7.29 |

(Continued)

OTHER PUBLICATIONS

Isgar, Charles, Opinion Aggregation System, Patent Cooperation Treaty Application Serial No. PCT/US21/36154, filed on Jun. 7, 2021, International Search Report dated Sep. 17, 2021.

*Primary Examiner* — Anil K Bhargava
(74) *Attorney, Agent, or Firm* — Schmeiser, Olsen & Watts LLP

(57) ABSTRACT

Described is an opinion aggregation system. The system includes a server having a memory storing user information, a first user computing device and other user computing devices coupled to the server. The server is programmed to receive and store an opinion request from the first user computing device and automatically process the opinion request and generate an opinion request to send to the other user computing devices for display and for entering an opinion. The server may be programmed to deliver the opinion request to the other user computing devices and then receive and store the opinions entered by the other user computing devices. These responses may be delivered to the first user computing device for viewing. The user may either filter the opinions received or filter the opinion request by selection of one or more filters, wherein the server only sends the opinion request to users matching the one or more filters.

6 Claims, 30 Drawing Sheets

(56) References Cited

U.S. PATENT DOCUMENTS

| | | | |
|---|---|---|---|
| 2009/0265366 A1* | 10/2009 | Marshall-Wilson | H04L 67/60 |
| 2012/0151319 A1* | 6/2012 | Eastman | G16H 40/67 |
| | | | 715/221 |
| 2014/0122504 A1* | 5/2014 | Courtier-Dutton | G06F 16/48 |
| | | | 707/748 |
| 2015/0089399 A1* | 3/2015 | Megill | H04L 12/1813 |
| | | | 715/753 |
| 2018/0159987 A1* | 6/2018 | Celik | H04W 4/16 |
| 2018/0203835 A1* | 7/2018 | Carter | G06F 40/49 |
| 2020/0065336 A1* | 2/2020 | Cox | G06F 16/951 |

\* cited by examiner

OPINION AGGREGATION SYSTEM

CROSS REFERENCE TO RELATED APPLICATION

This application is a continuation of U.S. patent application Ser. No. 16/894,199, filed Jun. 5, 2020, which claims priority to U.S. Provisional Patent Application Ser. No. 62/863,783, filed Jun. 19, 2019, the disclosures of which are hereby incorporated entirely herein by reference.

BACKGROUND OF THE INVENTION

Technical Field

This invention generally relates to a system for gathering opinions, and more specifically to an opinion aggregation system for requesting opinions on a particular matter and receiving and aggregating opinions from other users of the system.

State of the Art

Many individuals seek the opinion of friends and family when it comes to many decisions that these individuals seek. This can include what shirt to wear, where to take a date to dinner, what hotel to stay in, what piece of furniture to purchase, what artwork to invest in and so forth. A drawback to this type opinion requesting and receiving is that family and friends will often provide an opinion that they feel the individual requesting the opinion is seeking in order to not hurt feelings and often refrain from stating what their true opinion is on a matter. This becomes detrimental to the individual seeking an opinion because they are receiving information clouded by the bias of feelings. Strangers often give the most honest feedback, making the ability to tap into such a source of honest feedback and opinions a desirable option. Such a system is lacking that allows for requesting and receiving opinions from strangers in a near real-time environment.

Additionally, many individuals often find that they have various amounts of time during which they seek various forms of entertainment. One form of entertainment that could be possible, but there is not a system that provides it, is one in which individuals can give opinions on various topics, subjects, items, and the like, that the individual is interested in, has expertise in, has affiliation with, and so forth.

Accordingly, what is needed is an opinion aggregation system for requesting and receiving opinions from others without identifying the opinion requester or the opinion giver.

SUMMARY OF THE INVENTION

An embodiment includes an opinion aggregation system comprising: a server having a memory storing user information; and a first user computing device and other user computing devices coupled to the server, wherein the server is programmed to: receive and store an opinion request from the first user computing device; automatically process the opinion request and generate an opinion request with response elements to send to other user computing devices for display and for entering an opinion; automatically deliver the opinion request with response elements the other user computing devices for display and entering an opinion; receive and store the opinions entered by the other user computing devices; and automatically deliver the received opinions entered by the other user computing devices for display on the first user computing device.

Another embodiment includes an opinion aggregation system comprising: a server having a memory storing user information; and a first user computing device and other user computing devices coupled to the server, wherein the server is programmed to: receive and store an opinion request from the first user computing device; automatically process the opinion request utilizing artificial intelligence software to search for similar prior requests; and automatically aggregate prior opinions to similar requests and deliver the aggregated prior opinions for display on the first user computing device.

Yet another embodiment includes an opinion aggregation system comprising: a server having a memory storing user information; and a first user computing device and other user computing devices of a focus group coupled to the server, wherein the server is programmed to: receive and store an opinion request from the first user computing device, wherein the opinion request includes a request for an on-demand focus group; automatically process the opinion request and generate an opinion request with response elements to send to other user computing devices of the focus group for display and for entering an opinion; automatically deliver the opinion request with response elements to the other user computing devices of the focus group for display and entering an opinion; receive and store the opinions entered by the other user computing devices of the focus group; and automatically deliver the received opinions entered by the other user computing devices for display on the first user computing device.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Embodiments of the present invention relate to an opinion aggregation system for requesting and receiving opinions from others using the system. The system may include the use of a mobile application operating on a user computing device that may be a mobile computing device, such as a smartphone, a tablet, a wearable, and the like; and/or the system may operate on any type of computing device as a downloadable application or even as a web application.

Figure 1:
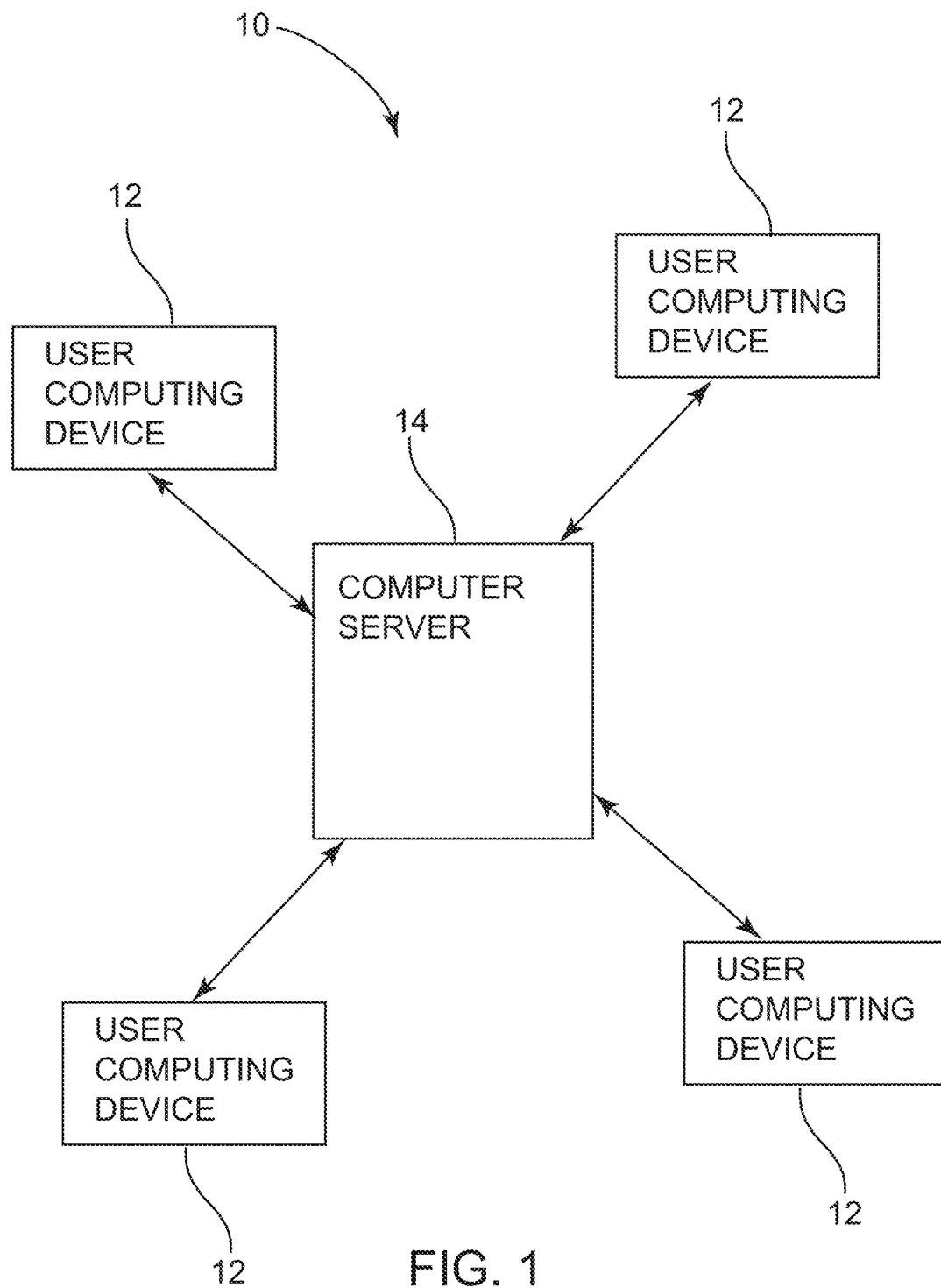
FIG. 1 a diagrammatic view of an opinion aggregation system according to an embodiment.
Figure 2:
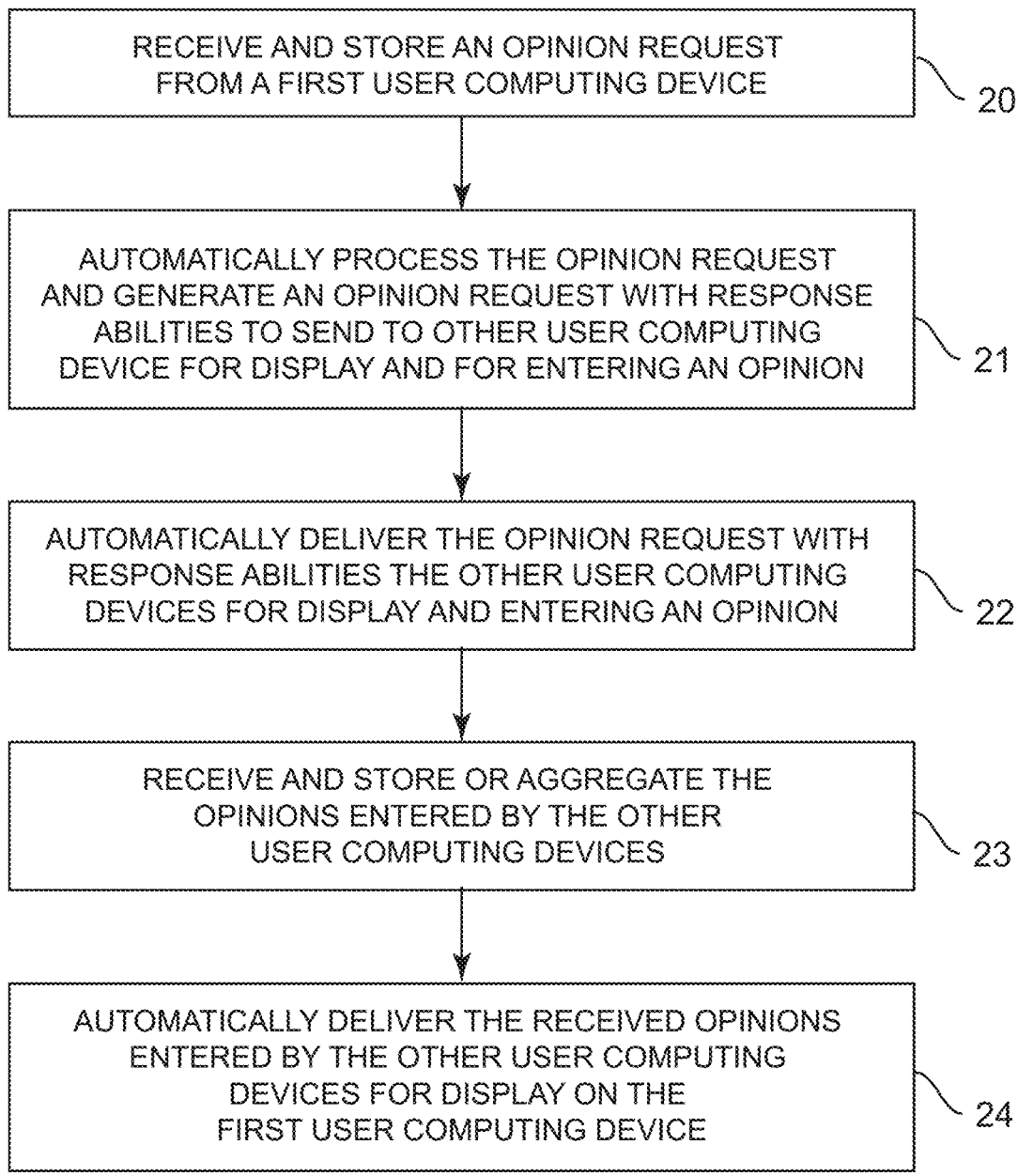
FIG. 2 is a flowchart of programmed instructions executed by a server of an opinion aggregation system according to an embodiment.

FIGS. 1-2 show an embodiment of an opinion aggregation system 10. FIG. 1 shows a diagram of opinion aggregation system 10. FIG. 2 shows a flow chart of programming of a system 10. In embodiments, a user includes any individual who is seeking for an opinion on a matter or any individual seeking to give an opinion on a matter.

FIG. 1 depicts an embodiment of an opinion aggregation system 10. The system 10 may include user computing devices 12 and a server 14, wherein each user computing device 12 is coupled to the computer server 14. This coupling may be a network connection, such as a wireless connection through an Internet connection, a Wi-Fi connection, a Bluetooth connection or the like, wherein the user computing devices 12 may communicate with and receive communication from the server 14. The user computing device 12 may be a desktop computer, a laptop, a tablet, a smartphone, wearable devices and the like. The server 14, in some embodiments, may be a computer server or a cloud-based infrastructure architecture.

The server 14 may include a memory storing various data. The memory of the server 14 may store user information, such as demographic information, and may further store opinion requests and opinions given and received, relating to each opinion request, and the demographic information of the opinion giver.

The user computing device 12 may be coupled to the server 14, and, referring to FIG. 2, the server 14 may be programmed to receive and store an opinion request from a first user computing device (Step 20); automatically process the opinion request and generate an opinion request with response elements to send to other user computing devices for display and for entering an opinion (Step 21); automatically deliver the opinion request with response elements to the other user computing devices for display and entering an opinion (Step 22); receive and store and/or aggregate the opinions entered by the other user computing devices (Step 23); and automatically deliver the received opinions entered by the other user computing devices for display on the first user computing device (Step 24). The response elements may include selectable elements and text entry boxes that may be respectively selected or into which text may be entered and then sent to the server 14.

Figure 3A:
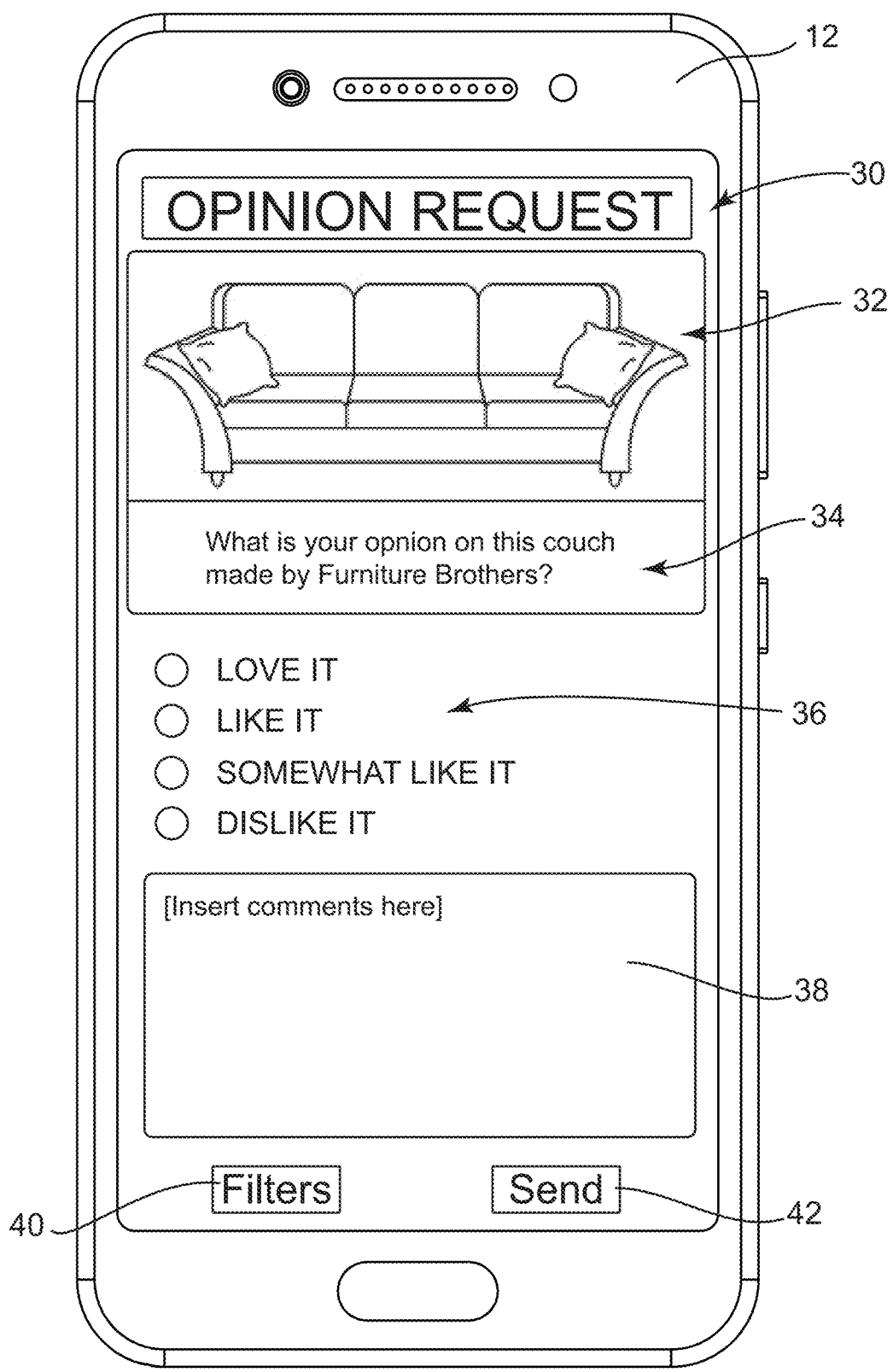
FIG. 3A depicts a user computing device operating an opinion aggregation system to request opinions according to an embodiment.
Figure 3B:
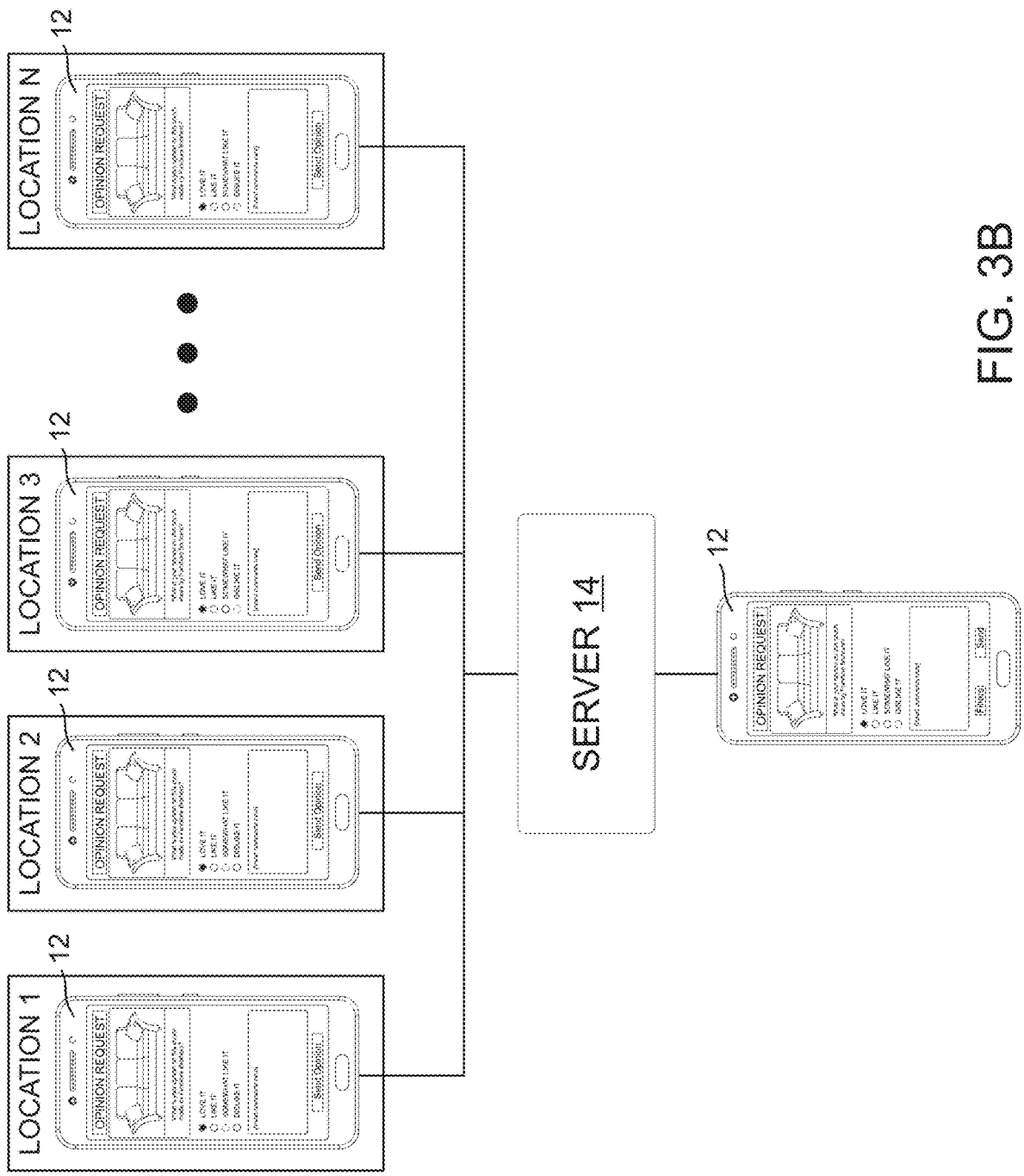
FIG. 3B depicts a plurality of user computing devices supplying opinions to a requested opinion from various locations according to an embodiment.
Figure 3C:
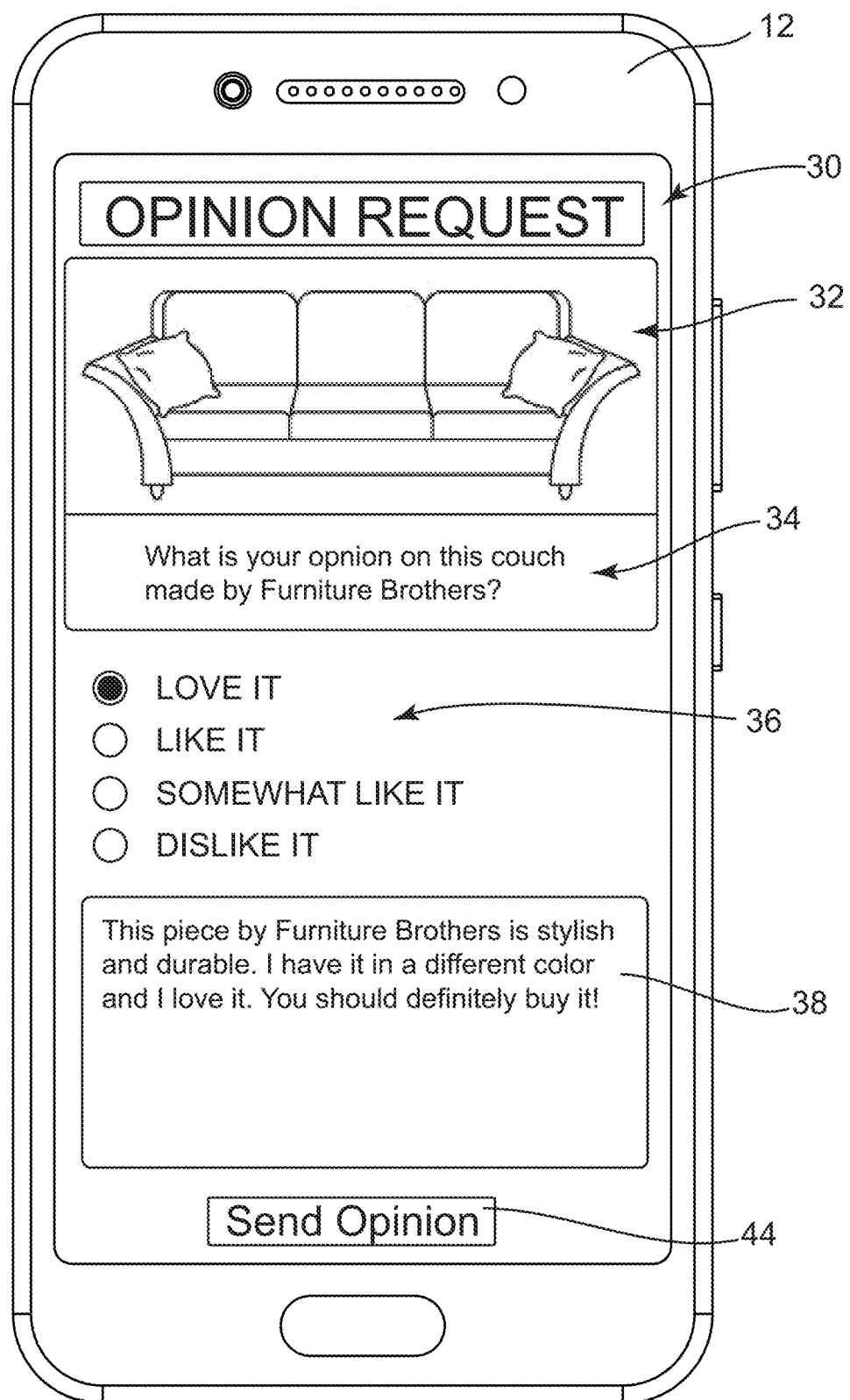
FIG. 3C depicts a user computing device responding to an opinion request according to an embodiment.
Figure 3D:
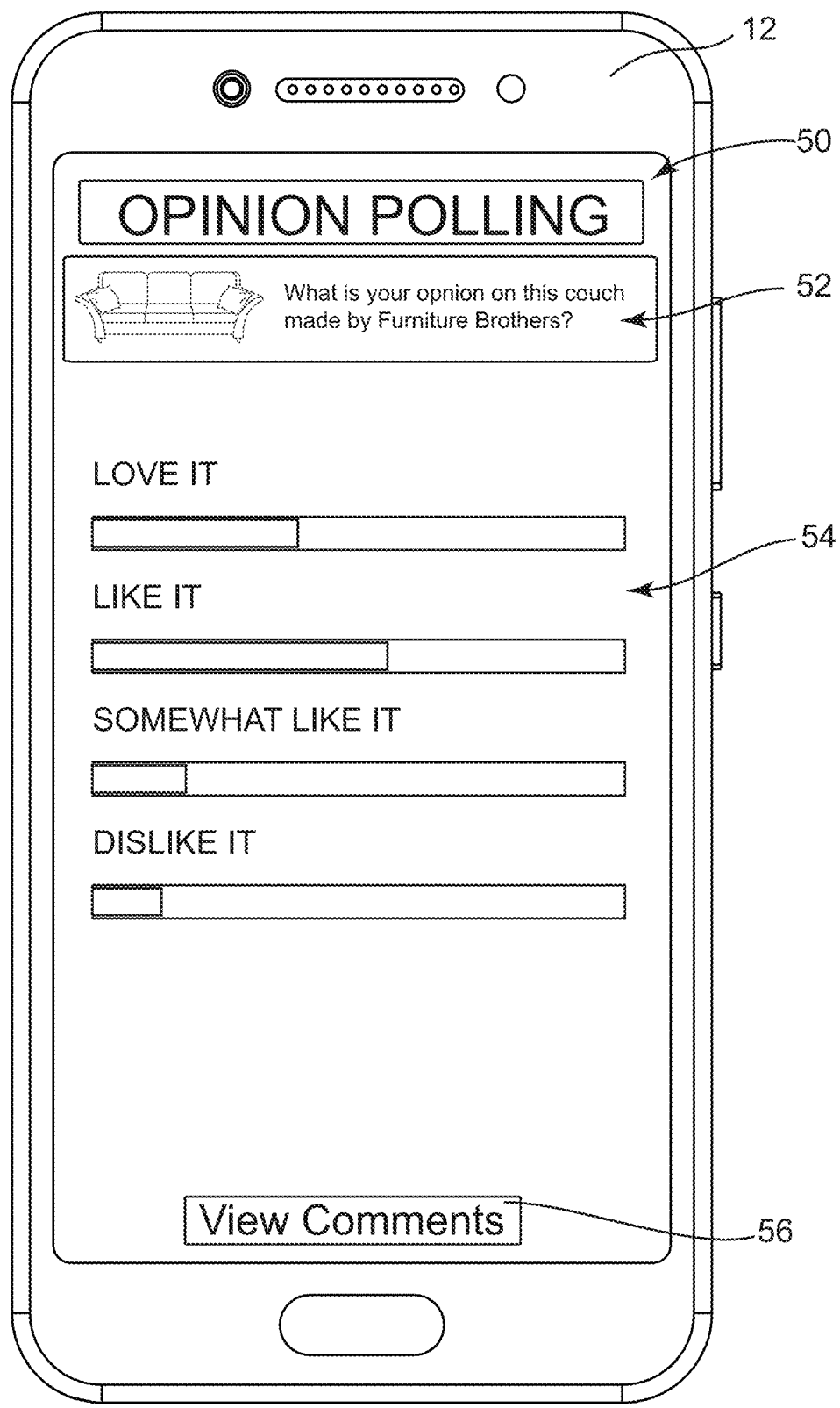
FIG. 3D depicts a user computing device displaying an opinion poll of a particular opinion according to an embodiment.

Referring to the drawings again, FIGS. 3A-3E depict various interfaces viewable with a user computing device 12 that may be available in an embodiment of the opinion aggregation system 10. FIG. 3A depicts a user computing device 12 operating an app of the opinion aggregation system 10 to request opinions according to an embodiment; FIG. 3B depicts a plurality of user computing devices 12 supplying opinions to a requested opinion from various locations according to an embodiment; FIG. 3C depicts a user computing device 12 responding to an opinion request according to an embodiment; and FIG. 3D depicts a user computing device 12 displaying an opinion poll of a particular opinion according to an embodiment.

Figure 6:
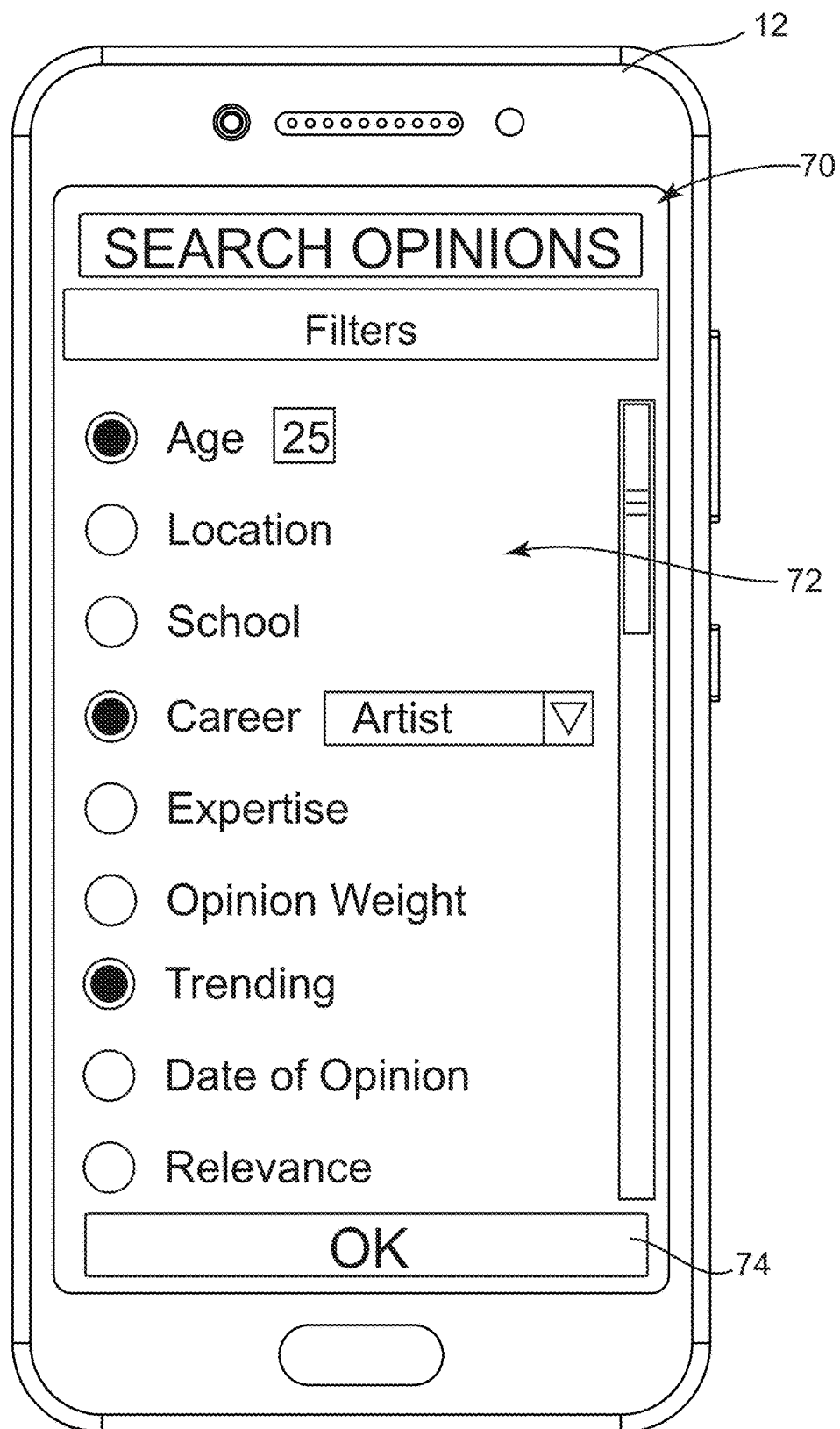
FIG. 6 depicts a user computing device displaying a filters interface according to an embodiment.

As shown in FIG. 3A, a user requesting an opinion may access the system 10 through the user computing device 12, wherein the user computing device 12 displays an opinion request interface 30 that may include a photo element 32, a question element 34, opinion selections 36, a comments element 38, a filters button 40 and a send button 42. The user seeking other opinions may utilize the opinion request interface 30 to request an opinion on a particular subject. The subject may include a photo uploaded in the photo element 32. This photo element 32 may be related to the opinion requested, such as, but not limited to a furniture item, as depicted, or any other item, object, or the like, related to the question element 34 seeking the opinions of others. The question element 34 may be entered by a user in the user computing device 12. The system 10 may automatically display opinion selections 36 associated with the question element 34. This may be selected automatically based on a server processing the question element 34 and suggesting opinion selections 36, or, in some embodiments, the user may select the type of opinion selections 36. The comment element 38 provides a means for a user to enter subjective comments to elaborate on a selected opinion selection. The filters button 40, when selected, may display a filters interface 70, as depicted in FIG. 6, wherein the user may select, on the user computing device 12, particular filters to limit the demographic of opinion givers that the opinion request will be sent to. Once the user has entered all of the information the user wishes to include in the opinion request, the send button 42 may be selected, whereupon the server 14 automatically generates an opinion request mirroring the information entered and selected by the user requesting the opinions and sends it or otherwise makes the opinions request available to other users of the system 10.

Referring to FIG. 3B, once the user selects the send button 42, the user computing device 12 of the requestor sends the opinion request to the server 14. The server 14 automatically generates an opinion request mirroring the information entered and selected by the user requesting the opinions and sends it to, or otherwise makes the opinions request available to, other users of the system 10. These other users may include opinion givers 1-N using user computing devices 12 each at a different location, such as Locations 1-N corresponding to the opinion givers 1-N. Each of the opinions entered by the opinion givers 1-N are received by the server 14 and the opinions are aggregated. An example of an opinion sent and stored in the server 14 is depicted in FIG. 3C, which includes an opinion giver selecting an opinion selection 36 in response to the question 34 and associated photo 32 and a comment 38 entered by the opinion givers. The opinion giver can send the opinion to the server 14 by selecting a send opinion button 44.

Figure 19:
FIG. 19 depicts a user computing device displaying an opinion interface of an influencer according to an embodiment.

Referring to FIG. 3D, the opinions may then be accessible through a user computing device 12. This may occur through an opinion polling interface 50 that includes an opinion request element 52, aggregation of opinion selections 54, and a view comments button 56, wherein selection of the view comments button 56 results in directing the user to the comments entered by opinion givers. This can be seen in FIG. 19 wherein the opinion giver is anonymously identified as Giver203. For example, and without limitation, the opinion of Giver203 may include comments provided by Giver203 and the ability of the user to rank Giver203. This ranking allows the opinion giver to become a greater influencer as the number of users ranking increases along with an actual increase of ranking.

Figure 3E:
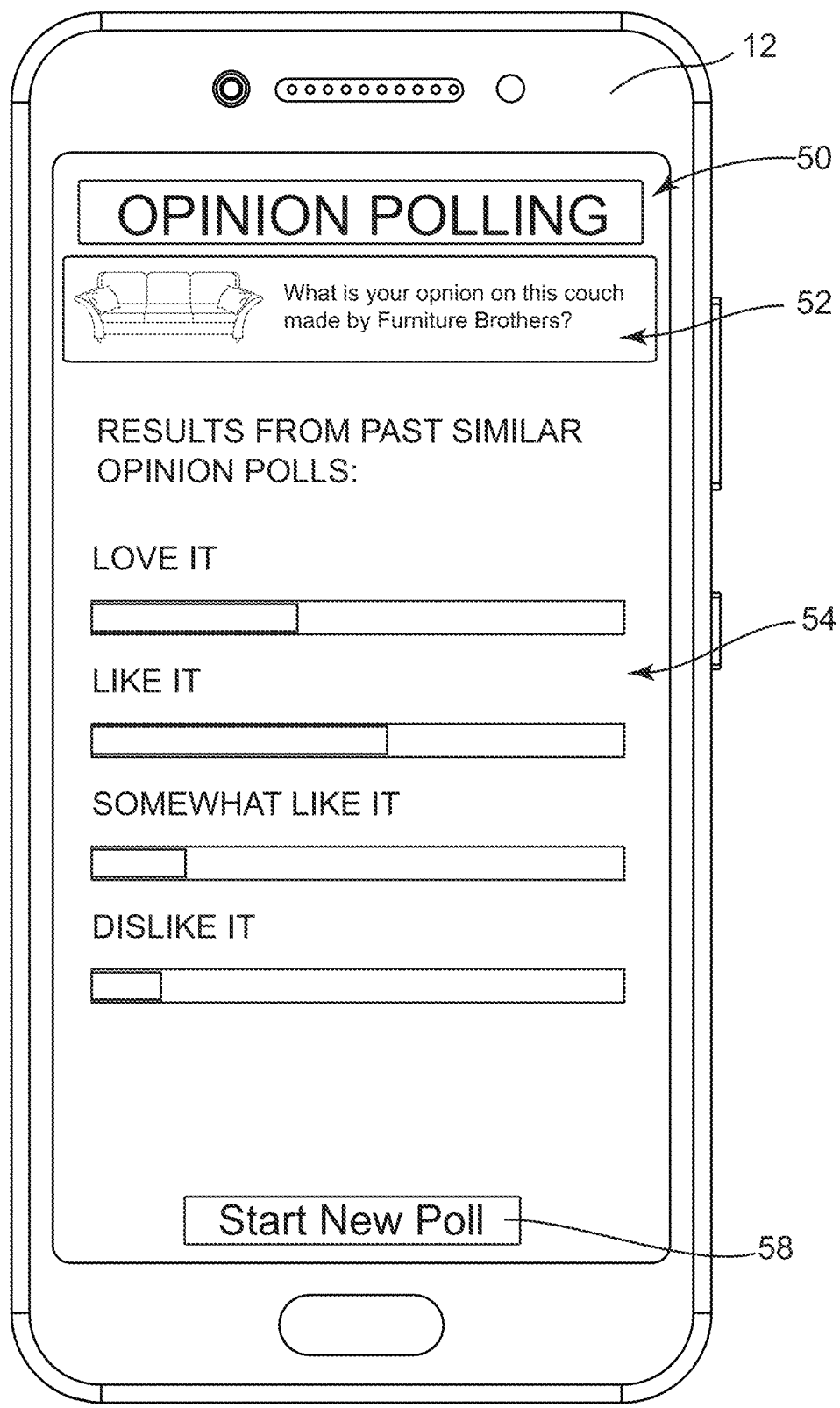
FIG. 3E depicts a user computing device displaying an opinion poll of a particular opinion that depicts artificial intelligent searching of past polls related to the requested opinion according to an embodiment.

Referring to FIG. 3E, a user may request an opinion as depicted in FIG. 3A. The system 10 may include the server 14 programmed with artificial intelligence software, wherein the artificial intelligence software operates to identify elements of the request and search for similar prior requests. The artificial intelligence software may then aggregate prior opinions related to the request and provide the aggregation of opinion selections 54 on opinion polling interface 50 that also includes an opinion request element 52, and a Start New Poll button 58, wherein selection of the Start New Poll button 58 results in starting a new poll as described with regard to FIGS. 3A-3D.

Figure 21:
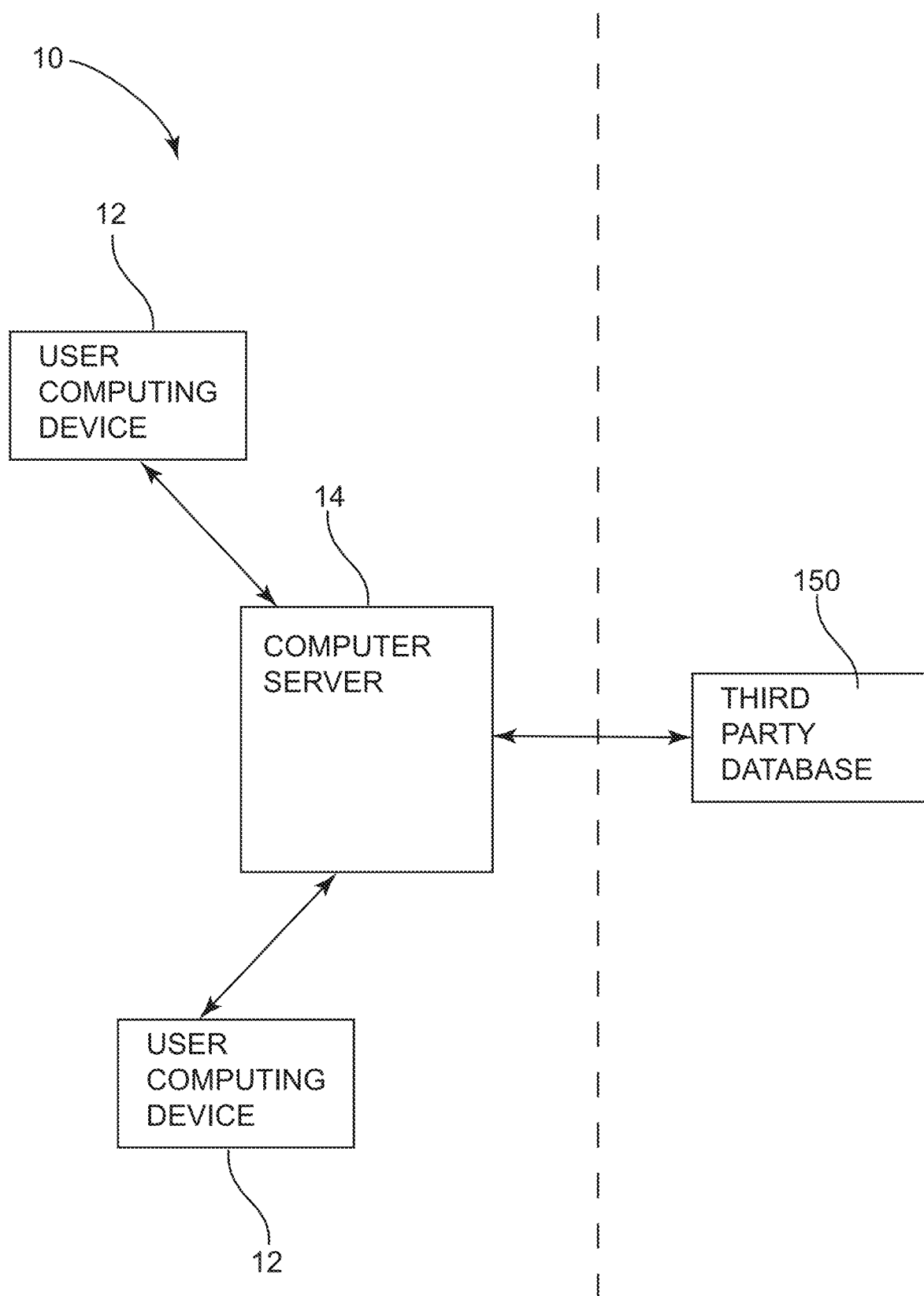
FIG. 21 a diagrammatic view of an opinion aggregation system obtaining opinion data from a third-party database according to an embodiment.

Referring further to FIG. 21, in addition to FIG. 3E, the system 10 may include the server 14, in some embodiments, programmed to access third-party databases 150 (databases outside of the system 10) to obtain opinion data collected and stored on those databases. This information may then be aggregated within the server 14 including the poll question or opinion request and the responses to the opinion request or poll question. This operates to make the aggregation of data even richer and provides additional information that the artificial intelligence software, as described with regard to FIG. 3E, may utilize in order aggregate prior opinions related to the request and provide the aggregation of opinion selections.

Figure 4:
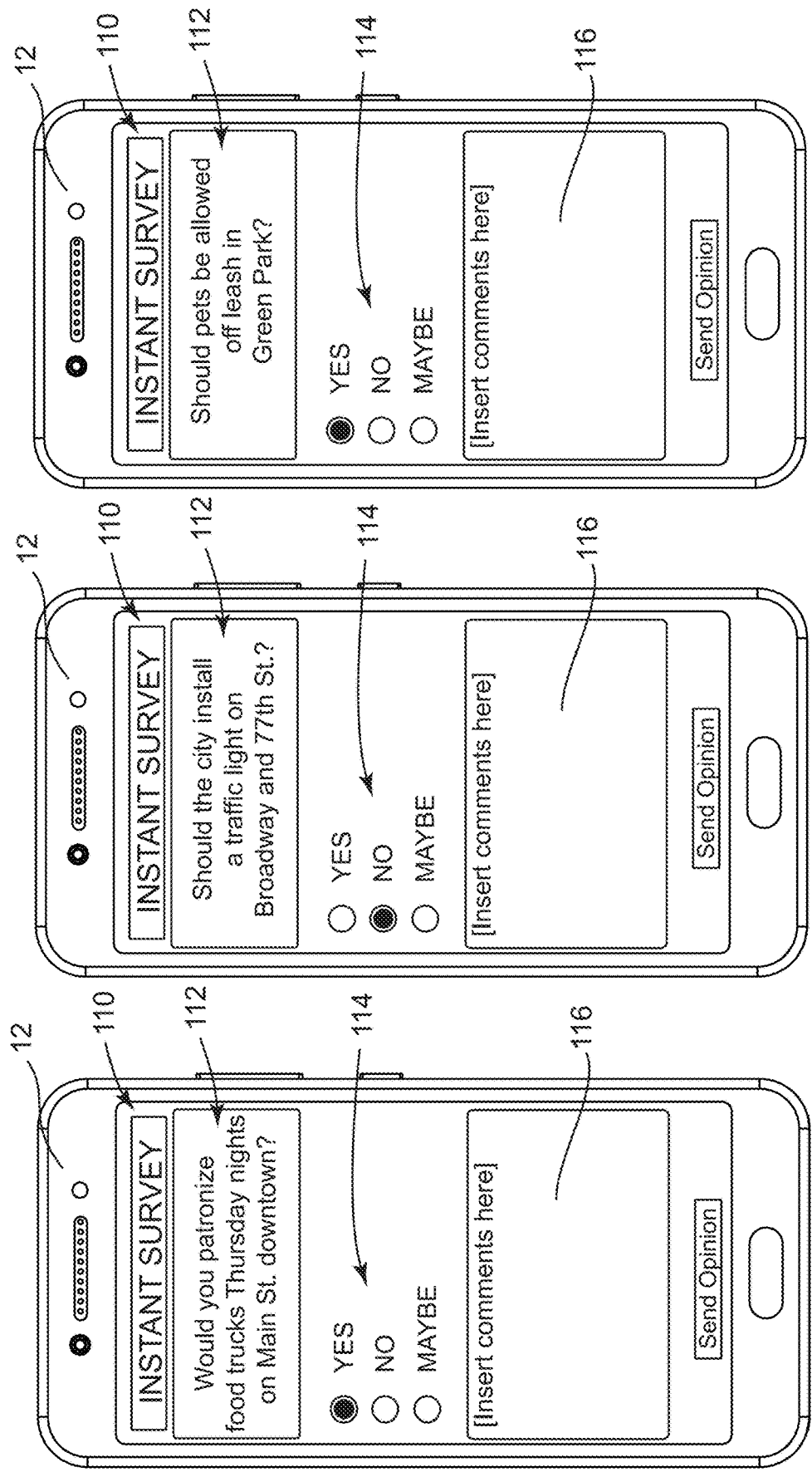
FIG. 4 depicts other user computing devices operating an opinion aggregation system for an instant survey relating to civic or community matters according to an embodiment.

While the system may be utilized for opinions based on products supplied by individual users, the system 10 may be utilized to provide instant surveys for such matters as civic or community issues, questions, events and the like. FIG. 4 depicts three non-limiting examples of such instant surveys depicted on instant survey interface 110. For example, an instant survey seeking immediate feedback may include a question 112, like the questions "Would you patronize food trucks Thursday nights on Main St. downtown?"; "Should the city install a traffic light on Broadway and $77^{th}$ St.?"; and "Should pets be allowed off leash in Green Park?" The opinion selections 114 may include such entries as "Yes", "No", and "Maybe". The instant survey interface 110 may also include a comments entry element 116 to capture and send user comments to the server 14 for storage in memory. All of the input from the opinions may be stored on the server 14 and aggregated in order to obtain useable data for analysis regarding input from users of the system 10.

Figure 5:
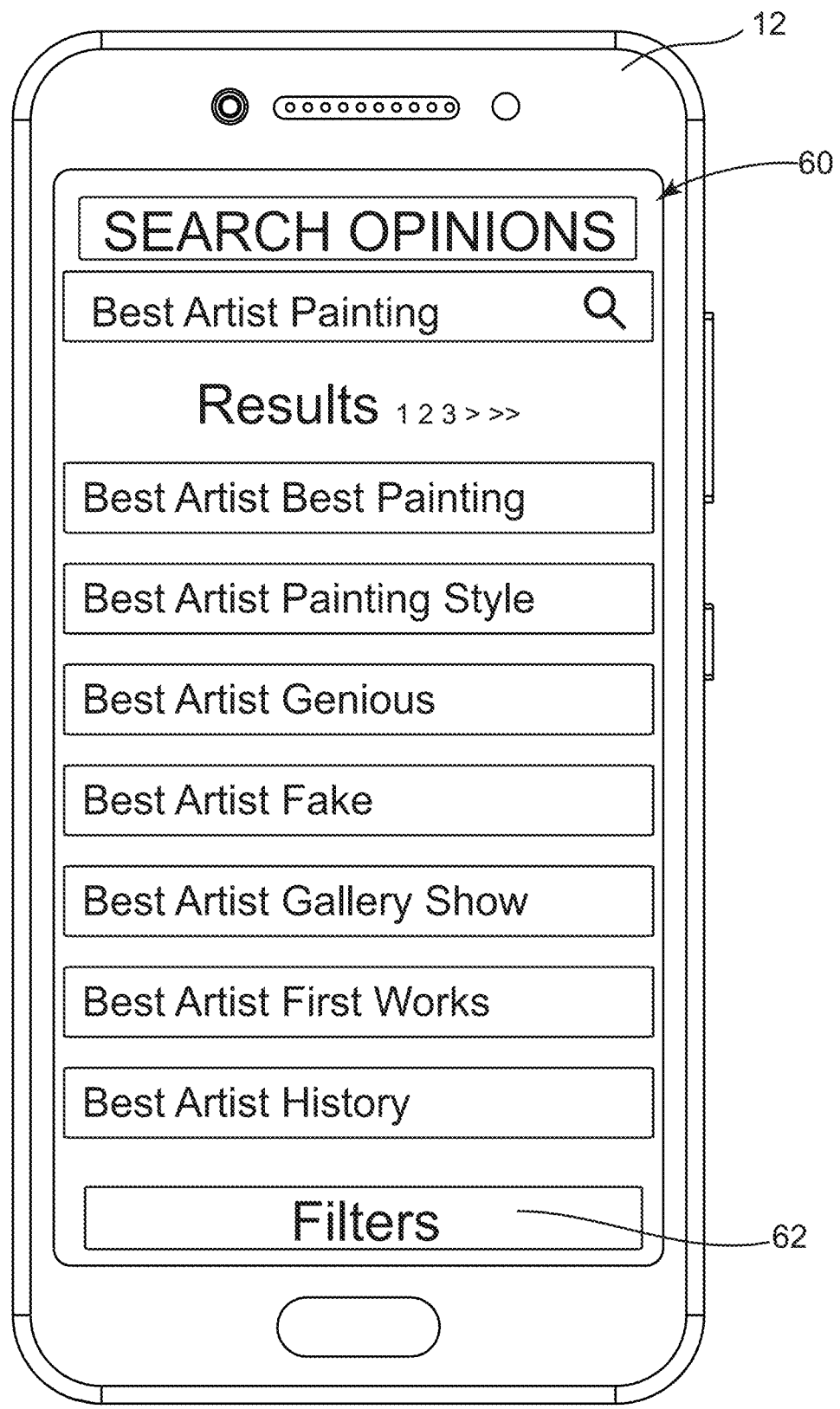
FIG. 5 depicts a user computing device displaying a search interface according to an embodiment.
Figure 18A:
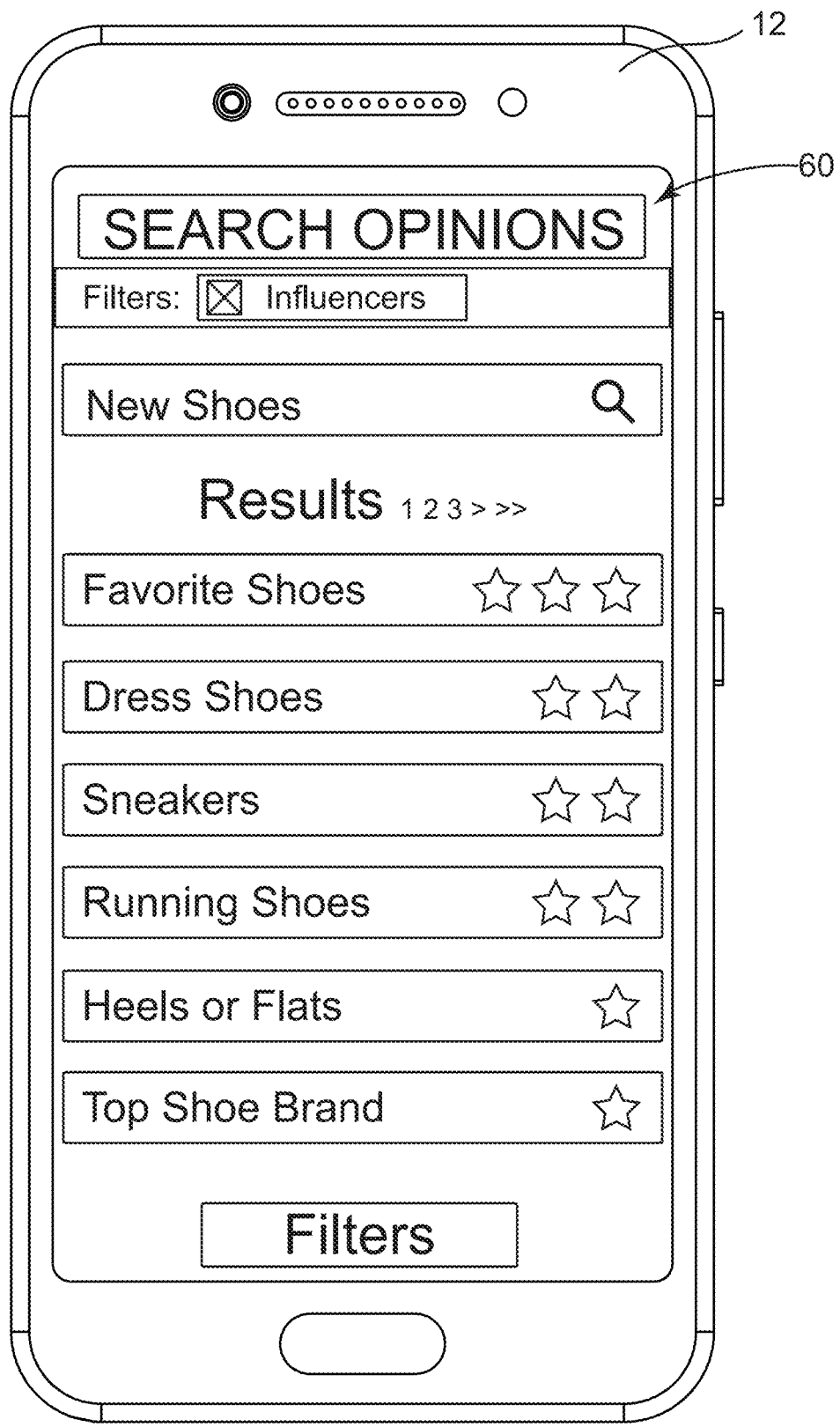
FIG. 18A depicts a user computing device displaying a search opinions interface with an influencers filter selected according to an embodiment.
Figure 18B:
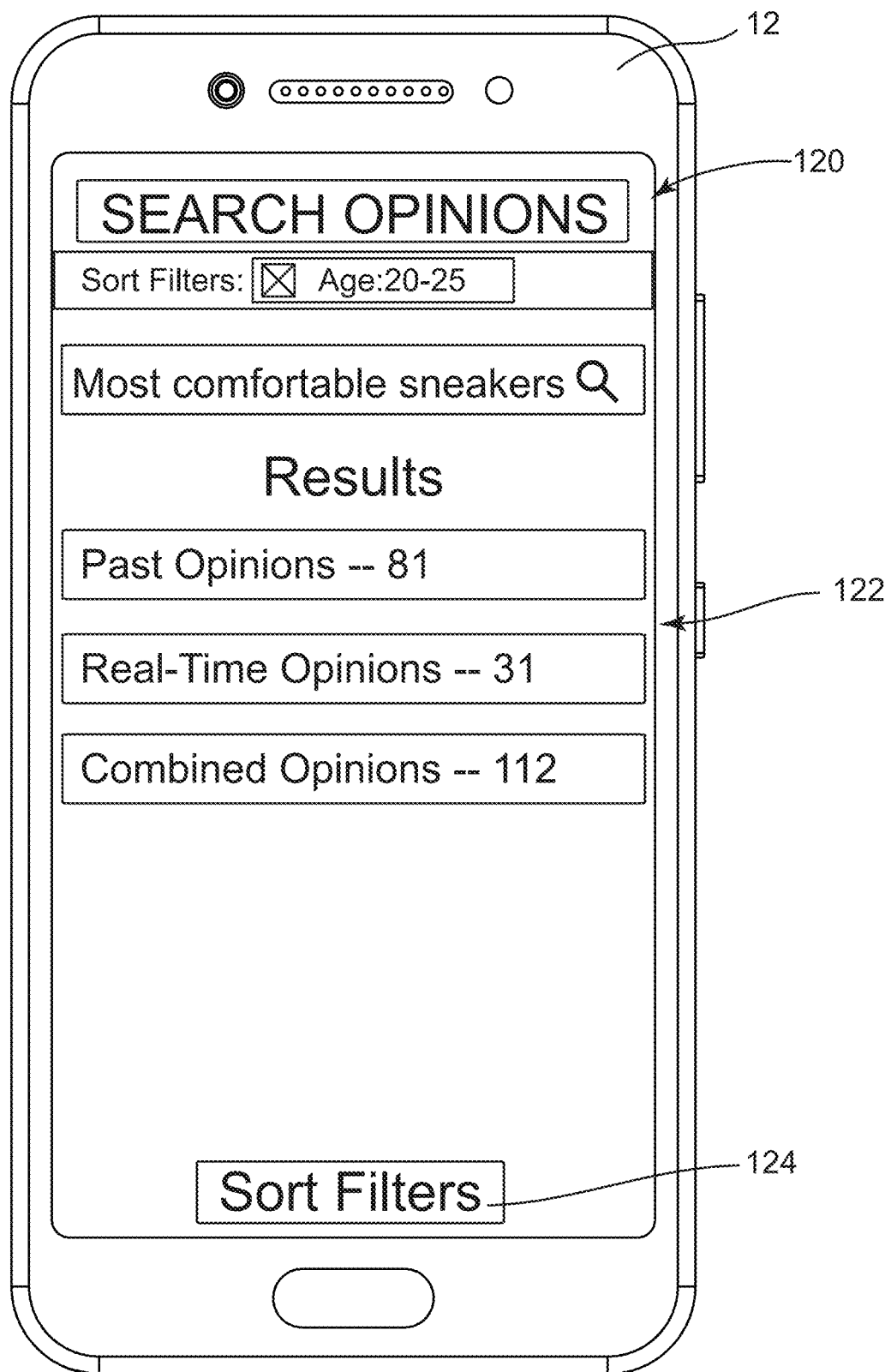
FIG. 18B depicts a user computing device displaying a search opinions interface showing links to past opinions, real-time opinions, and combined opinions according to an embodiment.
Figure 18C:
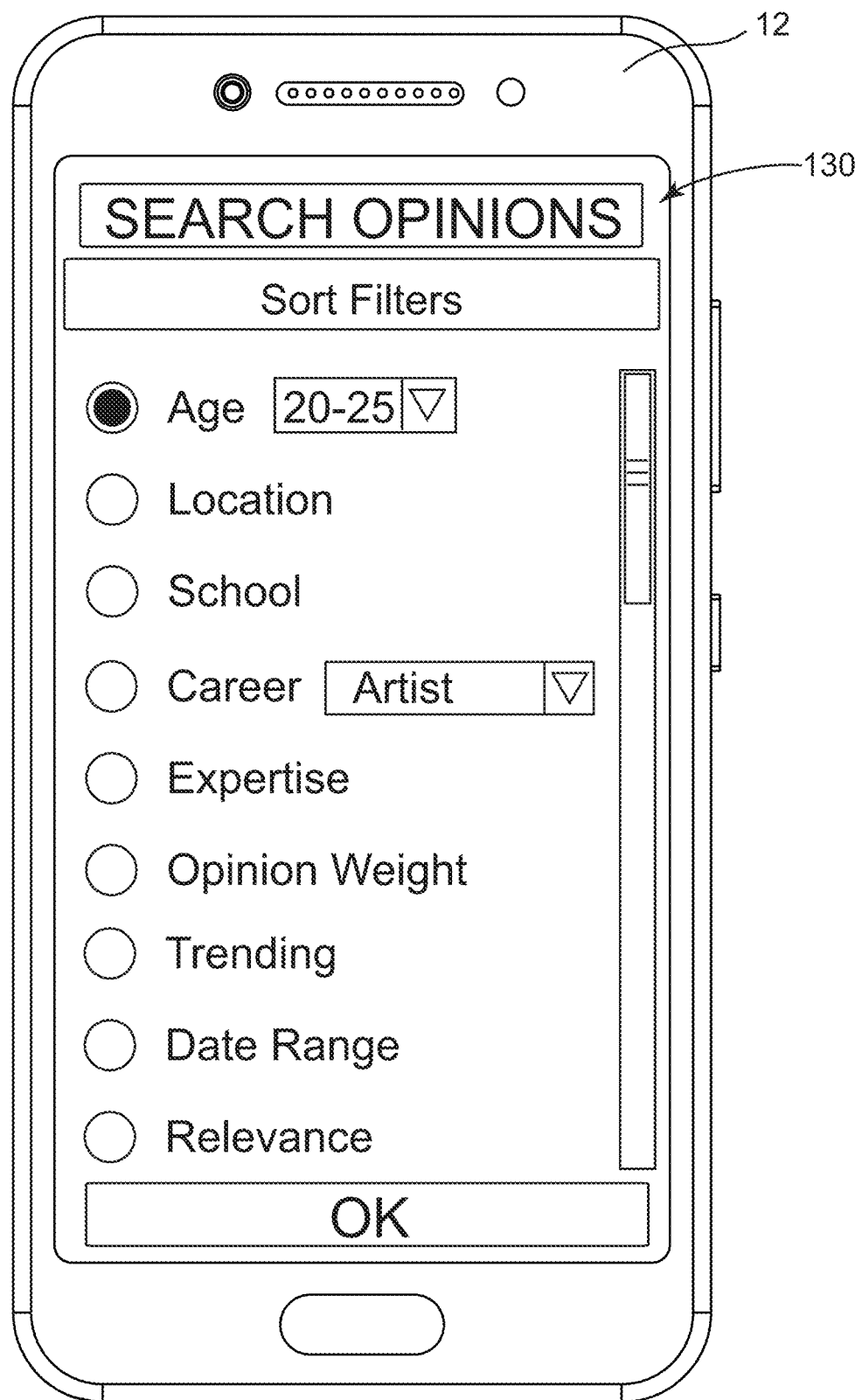
FIG. 18C depicts a user computing device displaying a sort filters interface according to an embodiment.

The system 10 may include a user computing device 12 that displays a search opinions interface 60, as shown in FIG. 5. The search opinions interface 60 allows a user to view a plurality of opinions and select an opinion for viewing. The user may also select a filters button 62 that opens a filters interface 70 as depicted in FIG. 6. The user may select certain available filters 72 and then select the OK button 74 to initiate the selected filters 72. Referring additionally to FIG. 18A, the user may select a filter of influencers and the search opinion interface 60 may display opinions that are associated with an influencer. These opinions may have a ranking, such as a star ranking. Additionally, users can search for opinions, as depicted in FIGS. 18B and 18C wherein a user may enter a search in a search opinions interface 60 that include a search input 120, and results 122 that include past opinions, real-time opinions and a combination of past and real-time opinions that may be selected and reviewed by the user on the user computing device 12. The user may also select a sort filters button 124 and choose one or more filters to sort the search results, as depicted in the sort filters interface 130 shown in FIG. 18C. The search results are then sorted based on the sort filters as shown in FIG. 18B.

Figure 18D:
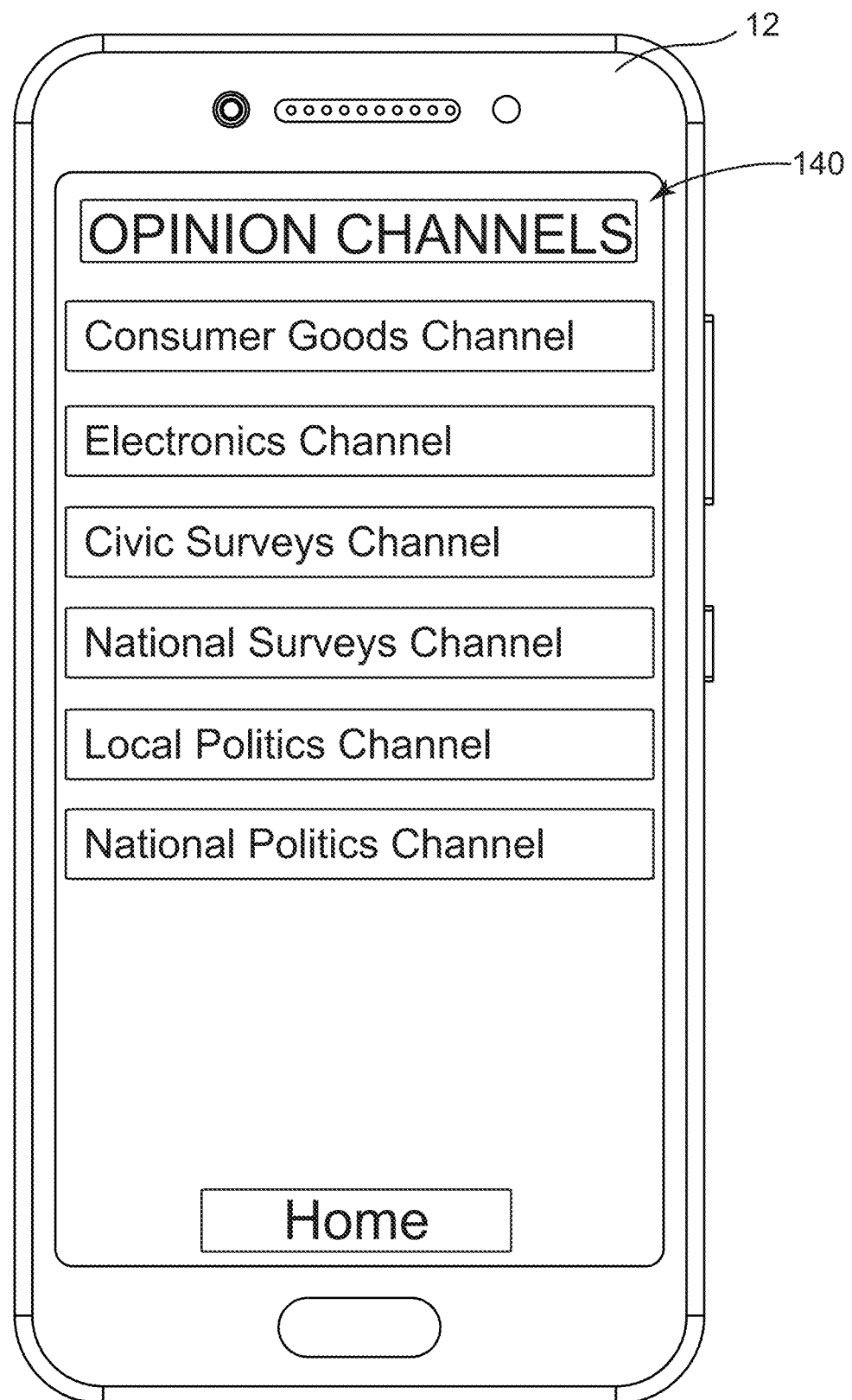
FIG. 18D depicts a user computing device displaying an opinion channels interface according to an embodiment.

Further still, a user may search opinions, both past and real-time, through an opinion channel interface 140 as shown in FIG. 18D. The user may see various channels that are categories of opinions gathered using the system 10. A user can select one of these channels in order to be directed to a results interface that shows the past and real-time opinions related to the opinion channel selected.

The system 10 operates to gather and collect data related to the opinions requested and the opinions given associated with the requested opinions they relate to. This allows a user to search and view data from past opinions, as well as to search for real-time opinions. The data can be utilized by entities to identify trends and relational information between opinion giver demographic information and opinions given and can thereby be utilized to determine what products, and the like, to target to certain groups of people.

Figure 7:
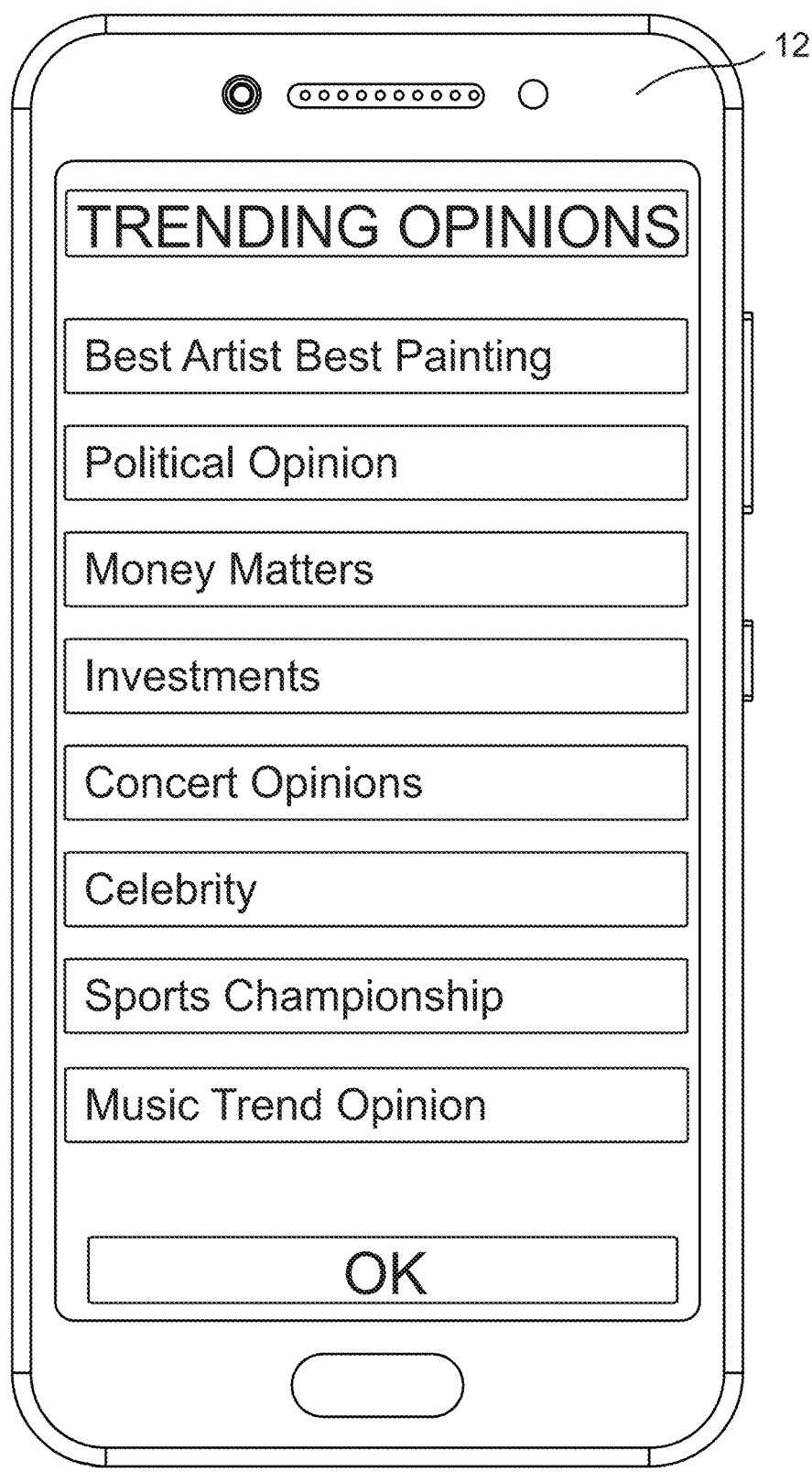
FIG. 7 depicts a user computing device displaying a trending opinions interface according to an embodiment.

Another way of searching opinions is shown in FIG. 7, wherein a user computing device 12 operating an app of the system 10 may display a trending opinions interface, wherein the particular opinions that are trending among other users is based on the number of users that have selected or recently selected the opinions.

Figure 8:
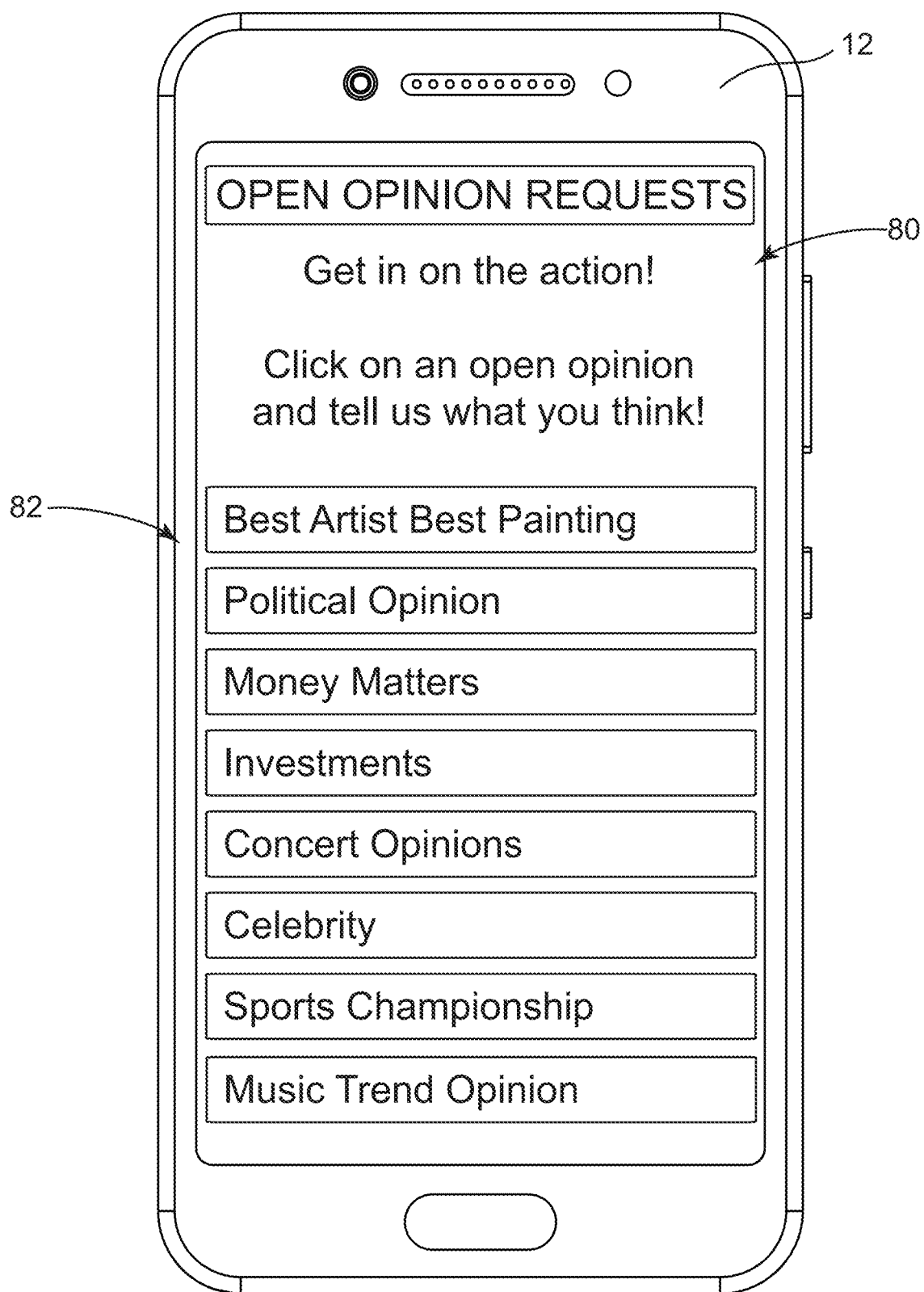
FIG. 8 depicts a user computing device displaying an open opinion requests interface according to an embodiment.
Figure 9:
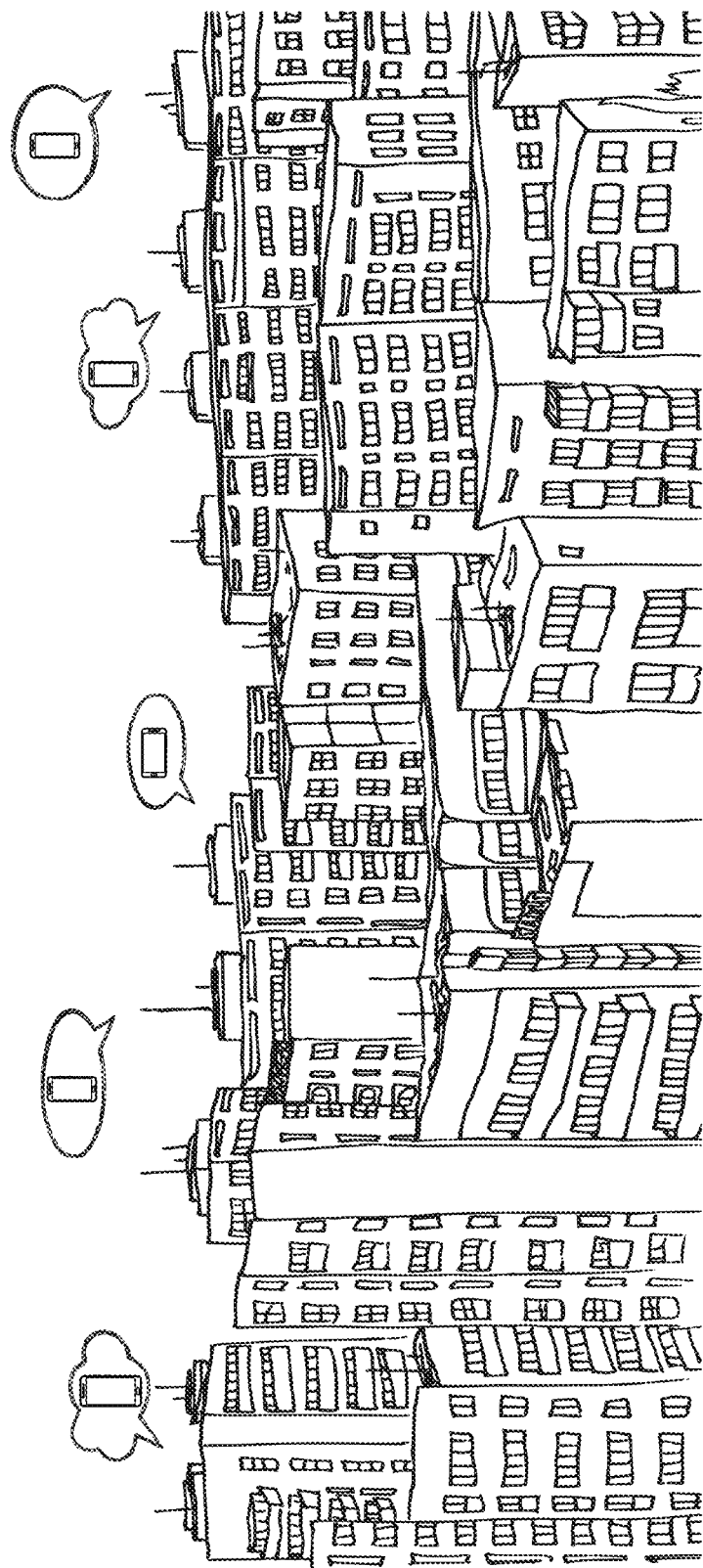
FIG. 9 depicts a perspective view of a city and a plurality of user computing devices operating an opinion aggregation system according to an embodiment.
Figure 10:
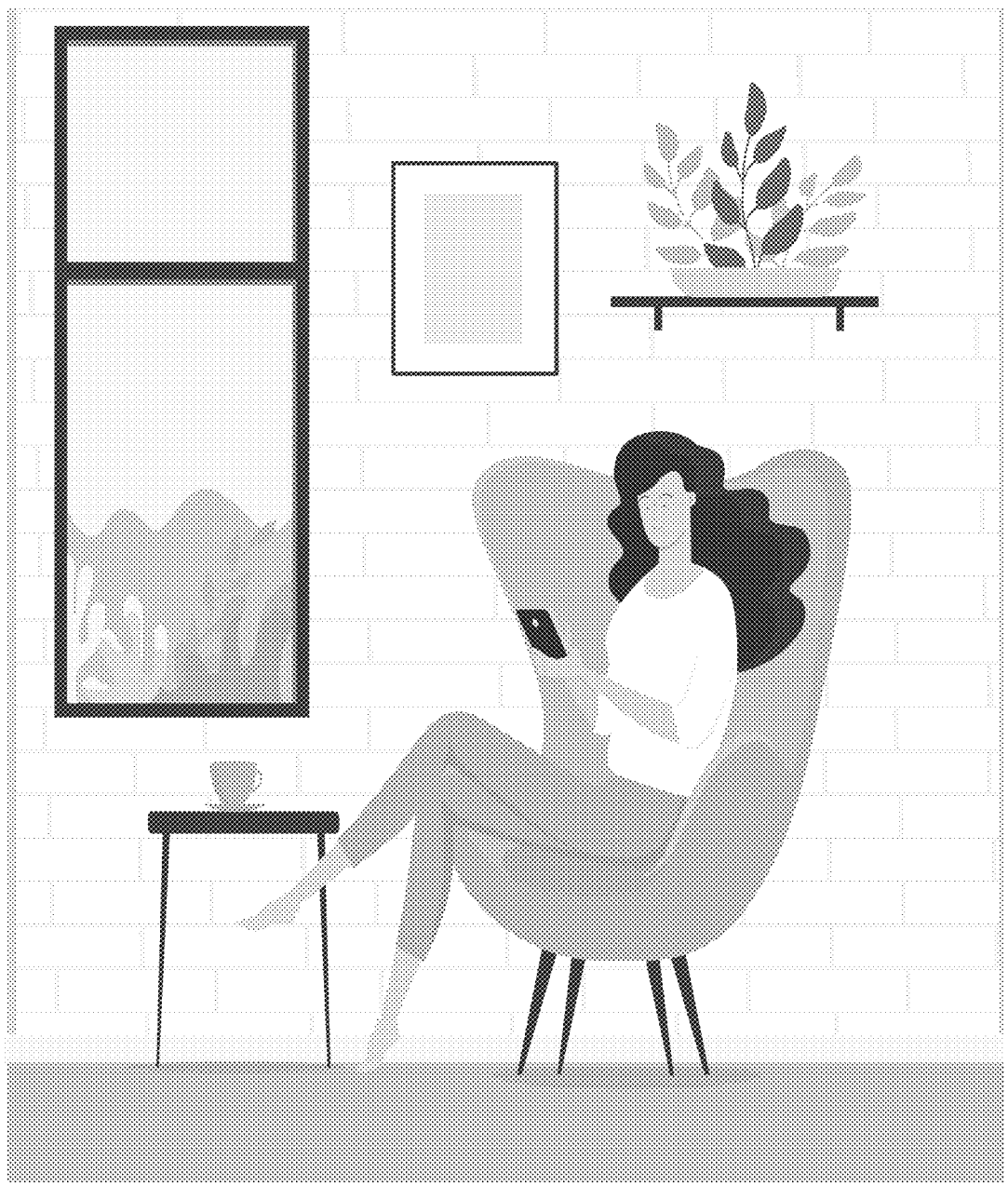
FIG. 10 depicts a user in a home participating in an opinion aggregation system according to an embodiment.
Figure 11:
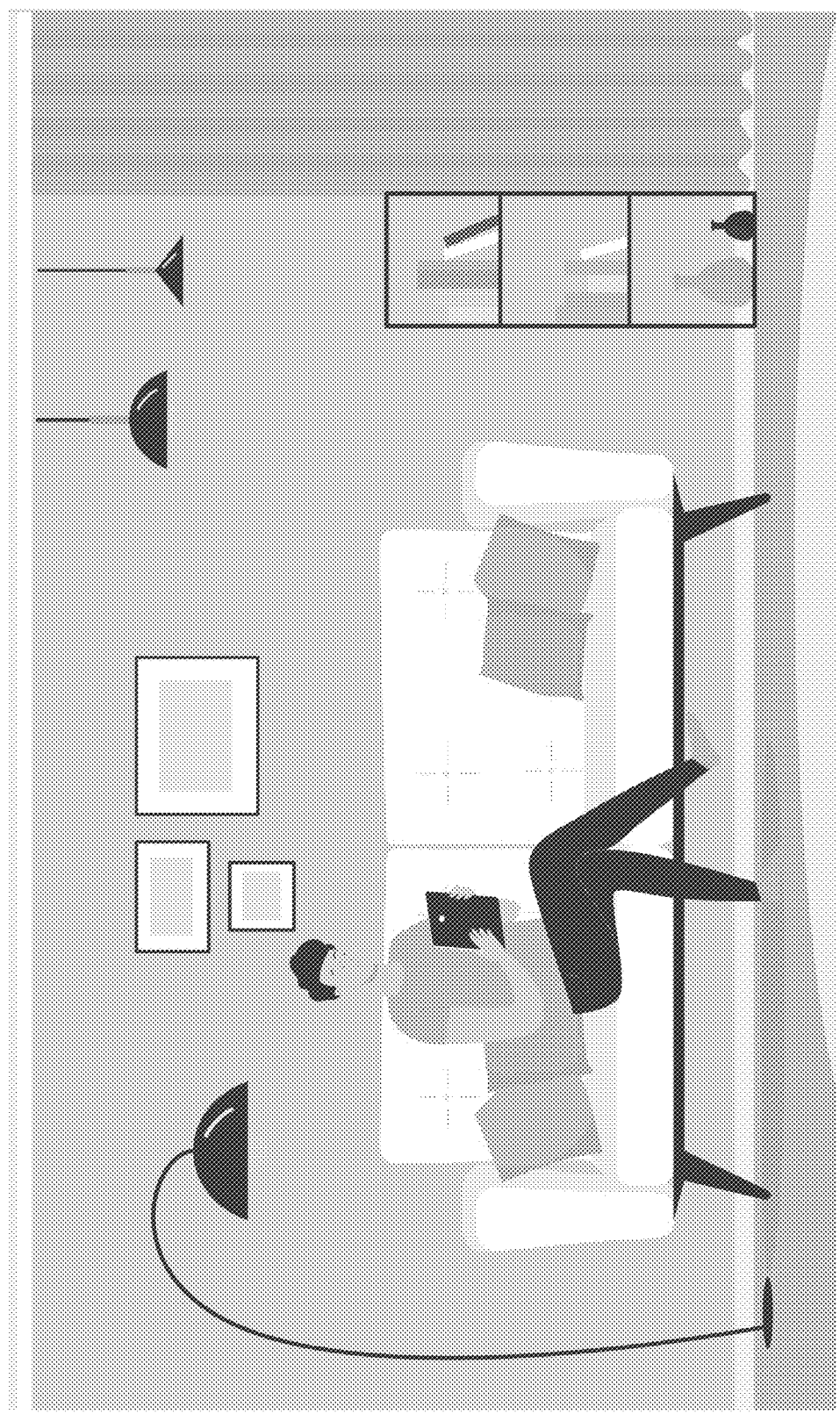
FIG. 11 depicts a user in an apartment participating in an opinion aggregation system according to an embodiment.
Figure 12:
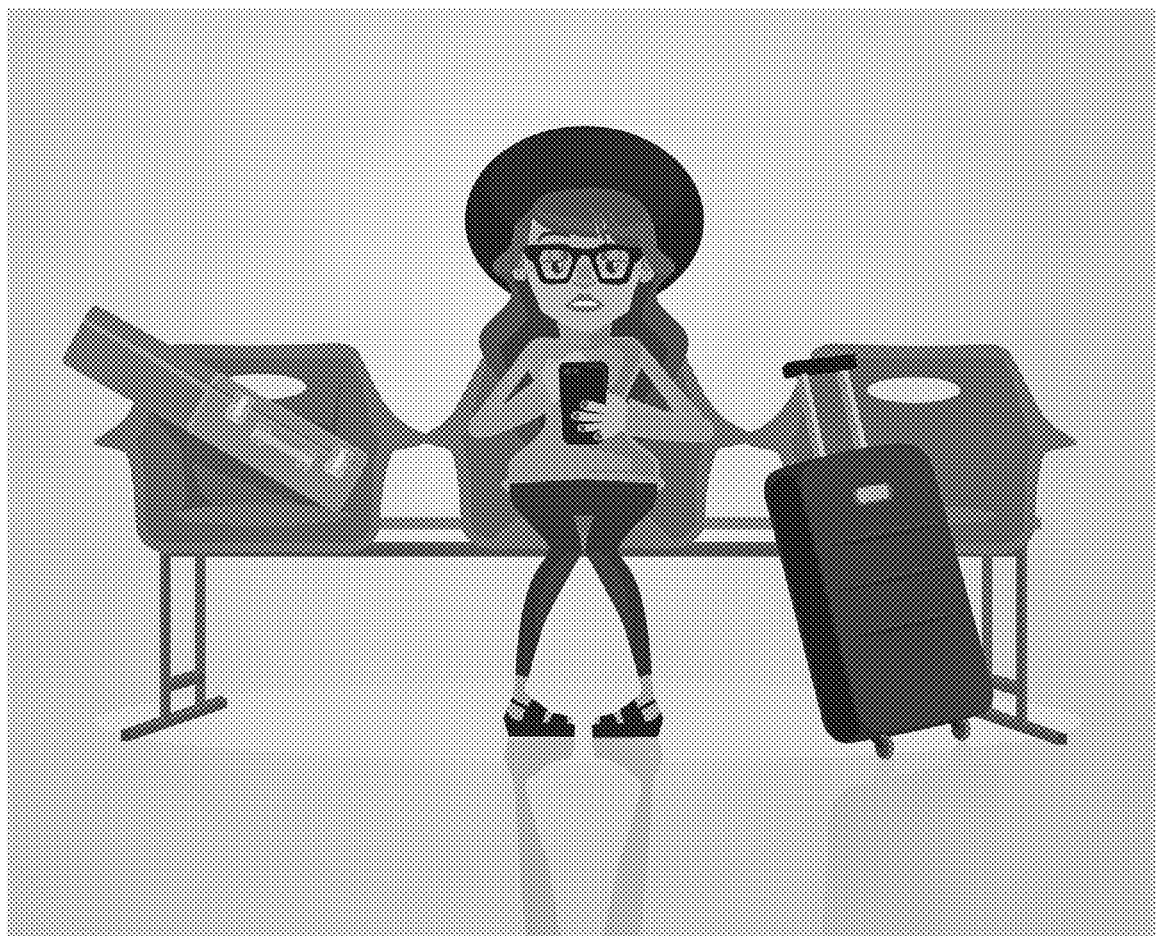
FIG. 12 depicts a user in an airport participating in an opinion aggregation system according to an embodiment.
Figure 13:
FIG. 13 depicts a user on a train participating in an opinion aggregation system according to an embodiment.
Figure 14:
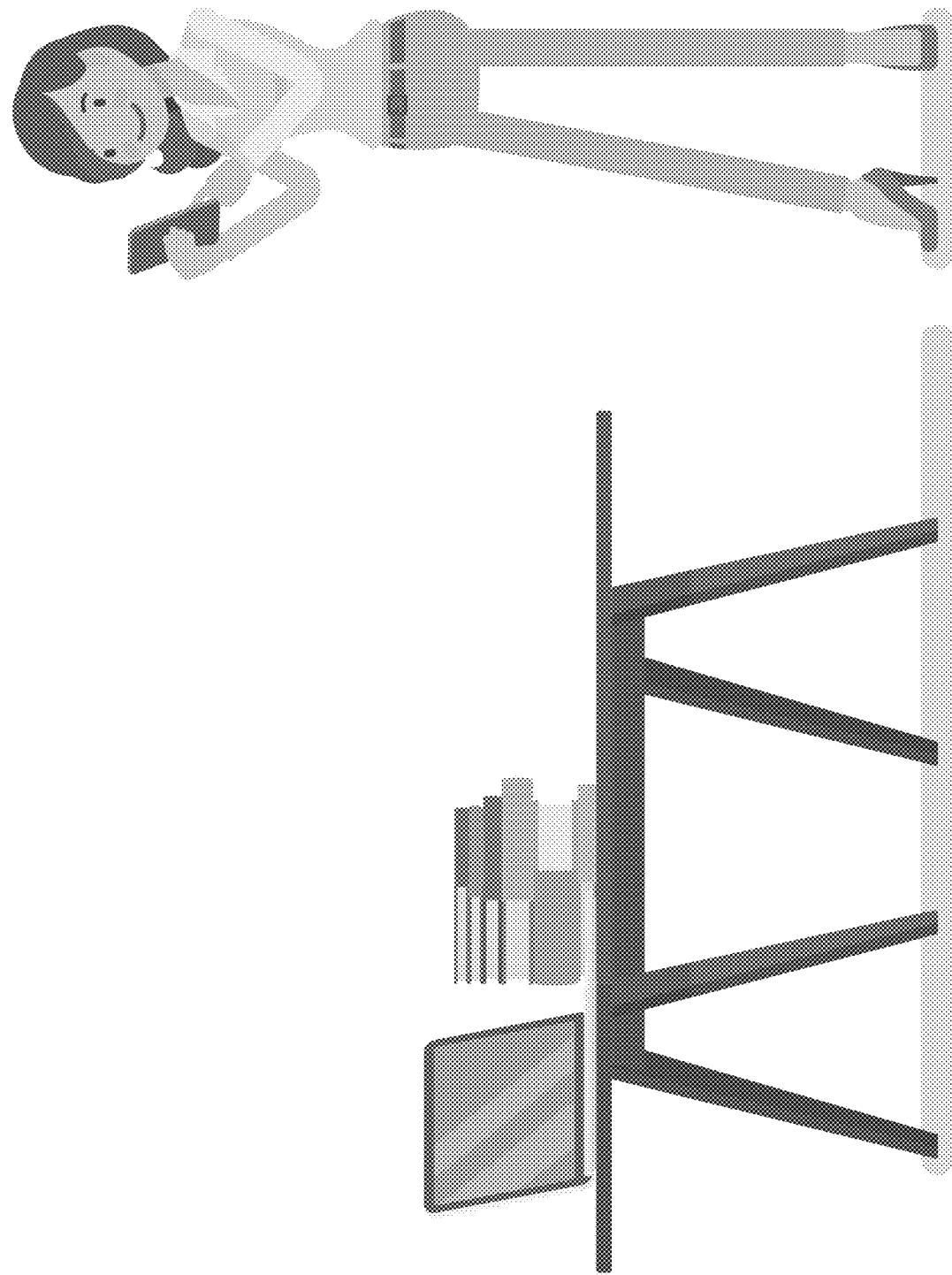
FIG. 14 depicts a user in an office participating in an opinion aggregation system according to an embodiment.
Figure 15:
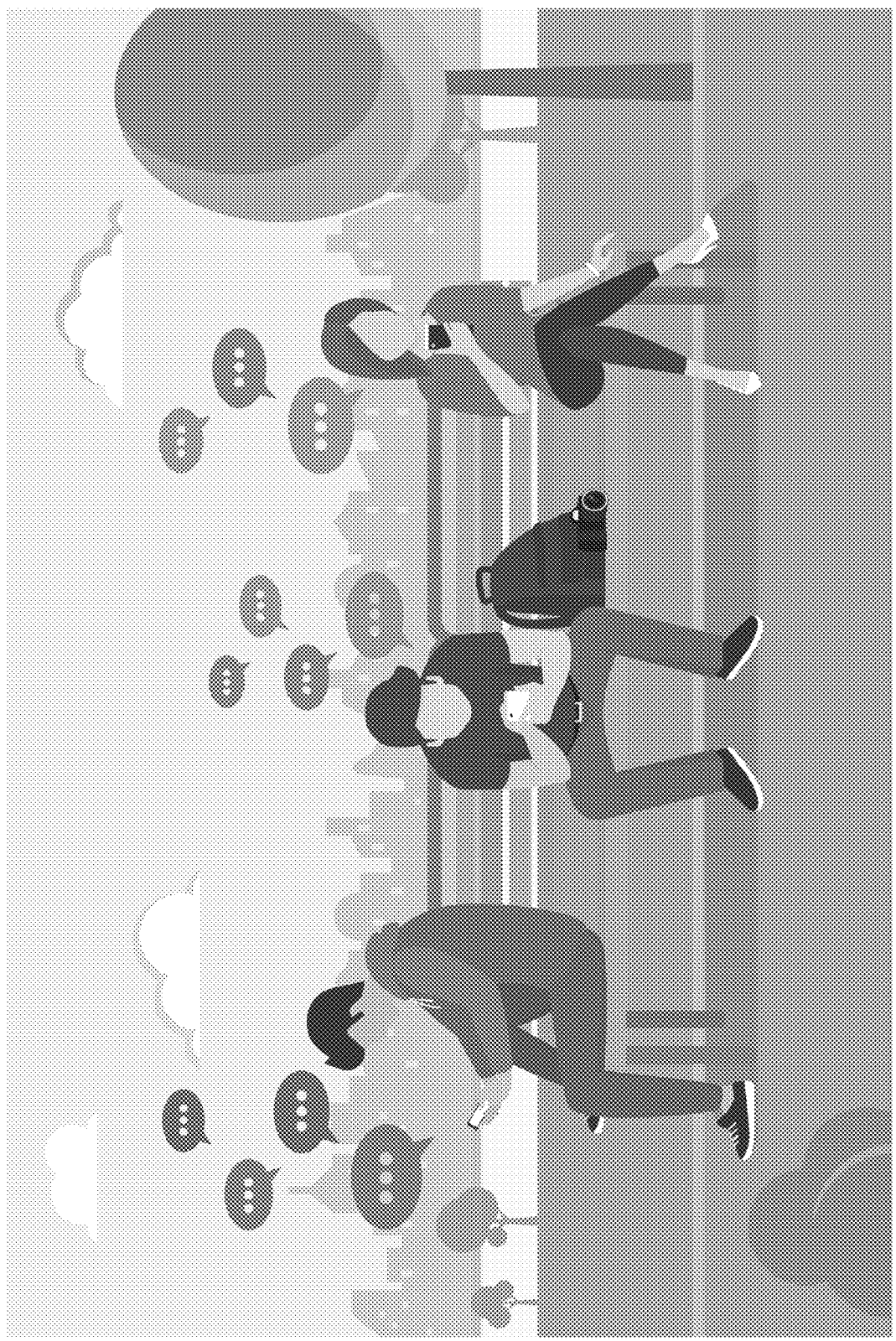
FIG. 15 depicts users at a park participating in an opinion aggregation system according to an embodiment.

Users that wish to be opinion givers, may view an open opinion requests interface 80, as shown in FIG. 8, wherein the opinion giver can select an open opinion 82 and then enter the opinion giver's opinion.

FIGS. 9-15 depict exemplary ways that users may engage the system to give opinions as a form of entertainment or to pass time when having downtime or breaks or the like. The system 10 is accessible from any location, including a home (FIG. 10), an apartment (FIG. 11), an airport (FIG. 12), a train (FIG. 13), an office (FIG. 14), a park (FIG. 15), and the like. This allows users of the system 10 to request opinions at any time and for individuals seeking the entertainment of giving an opinion to do so at any place that the user desires. It should be appreciated that there are a large number of the population that enjoy giving their opinion and this system 10 operates as a recreational fun activity for individuals to give their opinions regarding many different topics without the need to seek opinions. The system 10 then operates to entertain and to provide an enjoyable experience for the users to opine on topics that are meaningful to the individual.

Figure 16A:
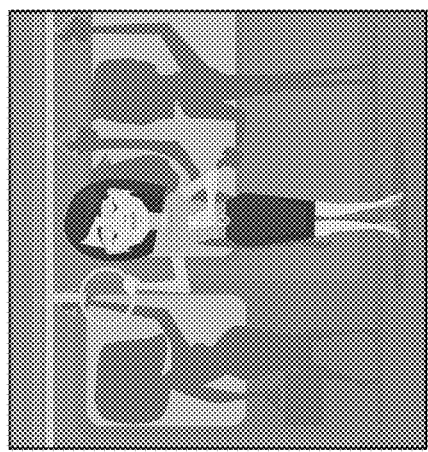
FIG. 16A depicts an on-demand panel of experts/focus group of an opinion aggregation system according to an embodiment.
Figure 16A:
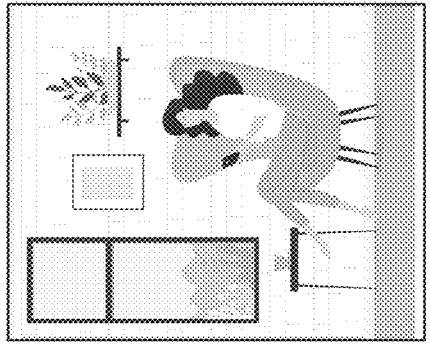
Figure 16A:
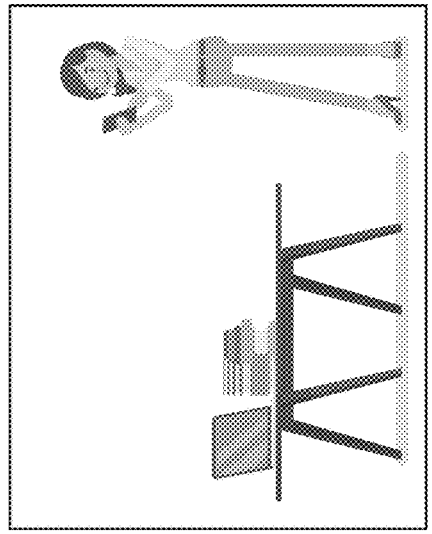
Figure 16A:
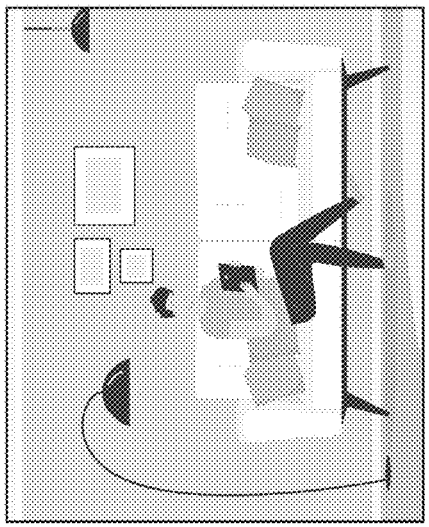
Figure 16A:
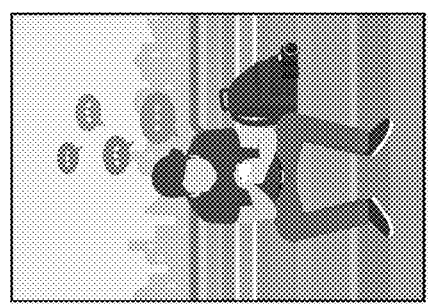
Figure 16A:
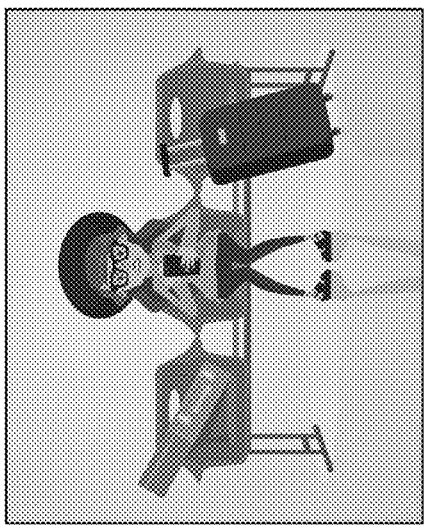

The ability of opinion givers to access the system 10 from anywhere allows the system 10 to be utilized to form an on-demand panel of experts/focus group 90, as shown in FIG. 16A. The on-demand panel of experts/focus group 90, including influencers, may include a user at a park 91, at an office 92, at a train 93, at an airport 94, at an apartment 95 and at a home 96, or any location where the user is located. The system 10 may operate to have a predetermined number of experts available for an expert panel/focus group. In other embodiments, a request for experts that meet the focus group criteria may be sent using the system 10 and the first predetermined number of experts to respond to the request will be a part of the focus group. The focus group may respond to the request with opinions as discussed above and shown in FIGS. 1-15 and 19. In embodiments, experts may be compensated for their participation in the expert panel/focus group. This allows businesses to utilize the system 10 in order to have real-time focus groups 90 regarding products or services provided by the company.

Figure 16B:
FIG. 16B depicts an on-demand, real-time focus group of an opinion aggregation system according to an embodiment.

Additionally, the system 10, as shown in FIG. 16B, may be utilized to form an on-demand, real-time focus group 90, such as a group of experts, influencers or the like. This can be done utilizing a communication link between all devices of the requester and the members of the focus group. Video and audio communication may be utilized that allow the requester to communicate directly with each other in order to provide real-time feedback on the opinion request. This may be in addition to normal forms of feedback provided by the system 10. As described above, in embodiments, experts or focus group members may be compensated for their participation in the expert panel/focus group. This allows businesses to utilize the system 10 in order to have real-time focus groups 90 regarding products or services provided by the company.

Figure 22:
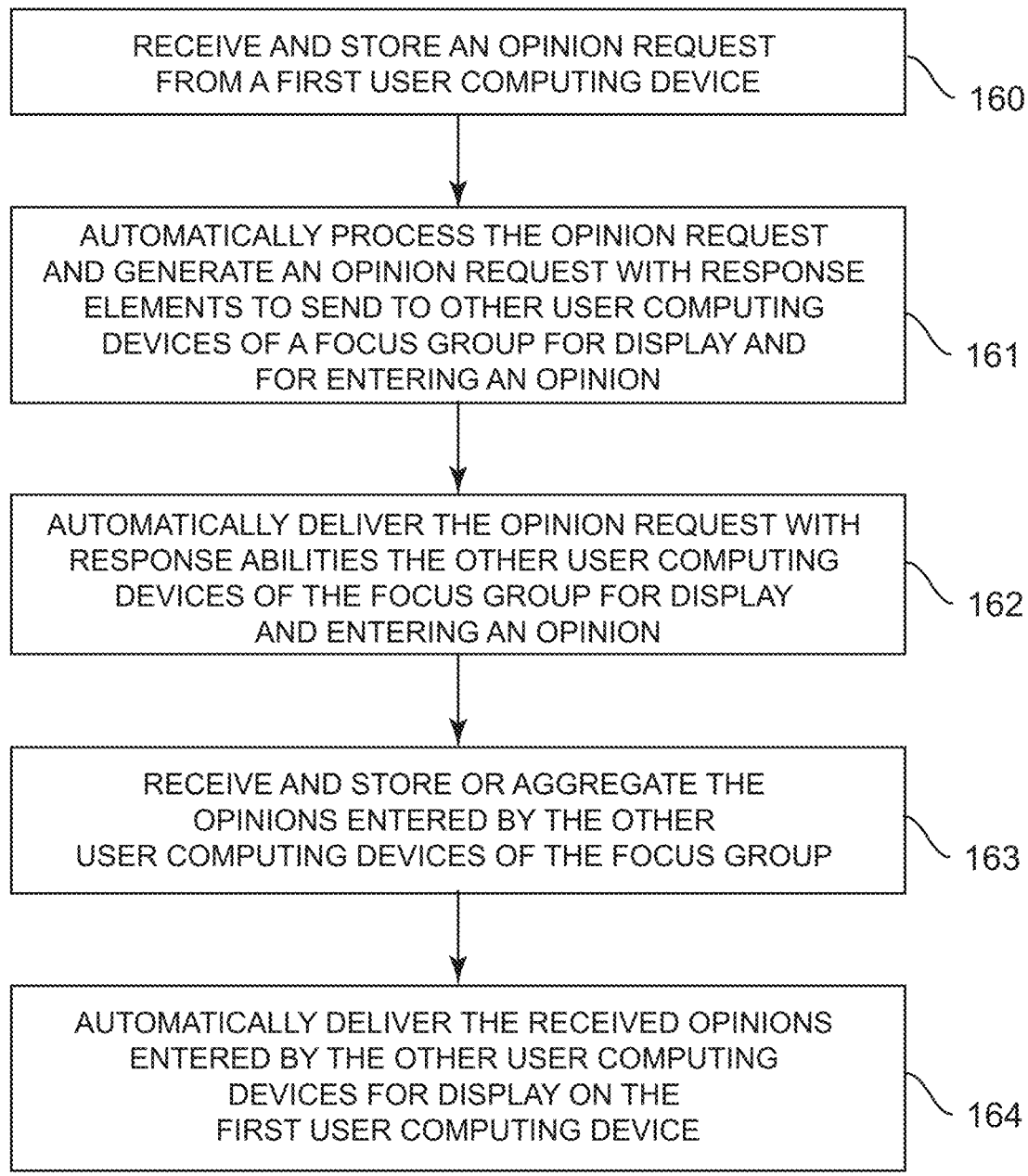
FIG. 22 is a flowchart of programmed instructions for forming an on-demand focus group executed by a server of an opinion aggregation system according to an embodiment.

In operation for focus groups, the user computing device 12 may be coupled to the server 14, and, referring to FIG. 22, the server 14 may be programmed to receive and store an opinion request from the first user computing device (Step 160), wherein the opinion request includes a request for an on-demand focus group; automatically process the opinion request and generate an opinion request with response elements to send to other user computing devices of the focus group for display and for entering an opinion (Step 161); automatically deliver the opinion request with response elements to the other user computing devices of the focus group for display and entering an opinion (Step 162); receive and store the opinions entered by the other user computing devices of the focus group (Step 163); and automatically deliver the received opinions entered by the other user computing devices for display on the first user computing device (Step 164). The response elements may include selectable elements and text entry boxes that may be respectively selected, or into which text may be entered, and then sent to the server 14.

This system allows for embodiments wherein those that are considered experts, influencers and so forth are compensated for being available for opinion giving. These individuals may utilize the system as a form of employment or to generate an additional stream of revenue by lending their insight and opinions to others in on-demand focus groups for providing an opinion or for real-time video focus groups for real-time interaction with a user requesting such a focus group. It will be understood that all users who give opinions, including experts, influencers and the like may be rated based on their interaction with the system and opinions given. This focus group aspect of the present invention allows people who want to work by giving opinions to be matched up with those who are seeking a service that such experts and influencers can provide.

Figure 17:
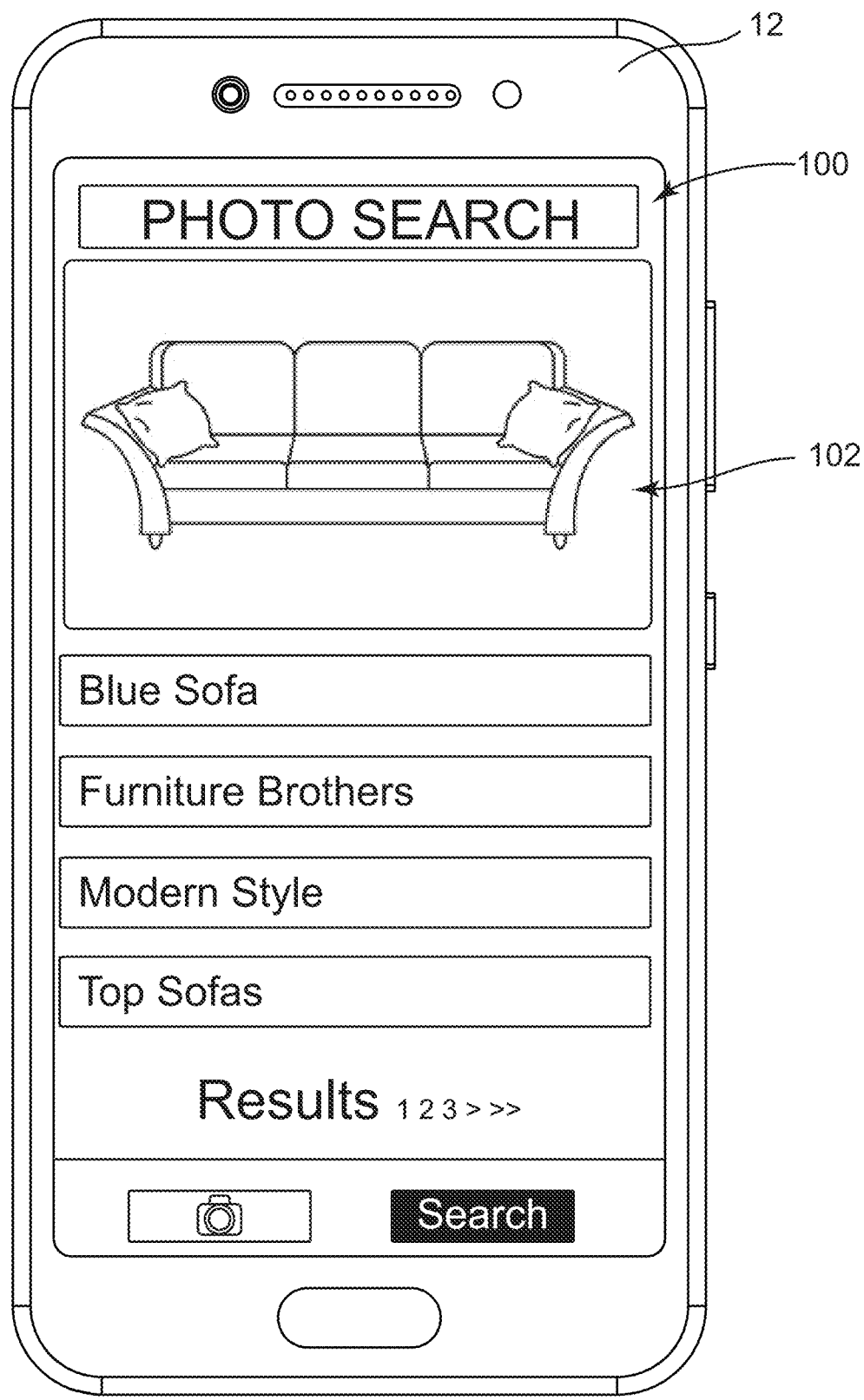
FIG. 17 depicts a user computing device displaying a photo search interface according to an embodiment.

FIG. 17 shows a photo search interface 100 of the system 10 according to an embodiment. The photo search interface 100, includes a photo 102 that is sent to the server 14. The server 14 processes the image and compares it to images uploaded as part of the stored opinion requests and returns opinions related to the photo 102.

Figure 20:
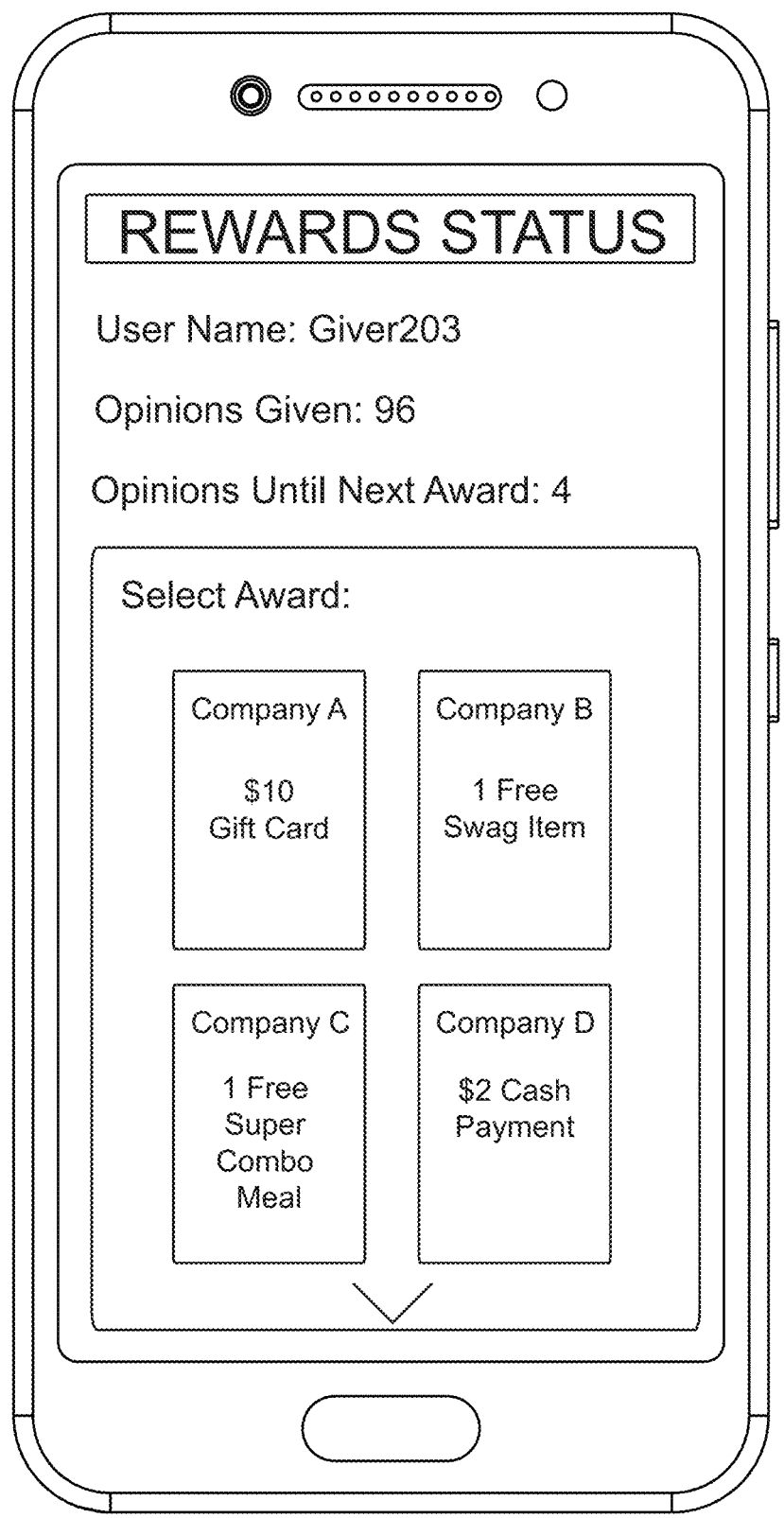
FIG. 20 depicts a user computing device displaying a user settings interface that includes rewards earned for using an opinion aggregation system according to an embodiment.

The system may include a rewards system as depicted in FIG. 20. A user that is an opinion giver may obtain rewards or awards based on use of the system, such as, but not limited to, awards based on number of opinions given. The system may track the number of opinions given, the number of opinions until the next award is achieved and may also store earned awards for later use. These earned awards may include, but are not limited to, discounts of purchases from companies for products/services or the like.

It is also contemplated that, in some embodiments, the system 10 may show how many users are actively using the system 10 and further adjust the number of users as certain filters are selected. This shows the user who wishes to request an opinion how many possible opinions she may receive when requesting opinions with certain filters selected. The user may then determine if she wishes to request the opinion at that time or when a greater population is available for response. In operation, the server 14 may push the opinion request to the user computing devices 12 of others not requesting the opinion and the system 10 may include notifications that are activated on the user computing devices 12 of those that can give opinions on a particular request.

It will be understood that while the system may collect and store certain demographic information of a user in order to determine if the user should receive requests for certain categories, the interaction on the system may be anonymous with the exception of allowing others to know what categories each user is associated with. In all other aspects, the users may by anonymous. An exception to the anonymity may include influencers, wherein certain influencers have a certain amount or type of popularity, such as an actor, a famous chef, a famous designer, a famous scientist, a professional athlete and the like.

The users of the system that are opinion givers may have the ability to filter the type of opinion requests that are sent to them. For example, and without limitation, an opinion giver may select the filters (as described above) that the opinion giver wishes to be pushed to his or her user computing device 12. This ensures that the opinion giver will only be sent opinion requests that the opinion giver is interested in commenting on.

The system 10 may further be utilized during social engagement events in order to obtain instant or near-instant polling of individuals. Those employing the system 10 may push opinion survey questions to participants in the social engagement, which may be viewers of a particular social engagement, and seek opinions on the event taking place. The types of opinion requests may be a request for agreement or disagreement, approval or disapproval, and the like, of certain topics discussed, and impact of decisions, and the like, that are the subject of the social engagement. The system may further provide for open-ended questions requiring comment by the participants. The user computing devices 12 would be used by participants in order to provide input to the system 10 as described above. The system 10 may store and aggregate the information as described above. The system 10 may then display near real-time feedback, such as to user computing devices 12 of the system, wherein those employing the system are also using user computing devices 12 to interact with the system 10.

In another embodiment, the system 10 may be utilized by businesses that may seek to have a consumer panel. This allows businesses to initiate an on-demand consumer panel by submitting an opinion request to the system 10. Since consumer panels typically have specific demographic criteria, embodiments of the system may allow the users to be paid to be available for such requests by businesses to ensure that businesses have the number of people necessary in the on-demand consumer panel to make statistical determinations regarding the opinions received. The system operates in a similar fashion as described above, with the additional element of ensuring that at least a certain number of opinion givers are available for certain filter criteria specific for the business during the times the business may need to have an on-demand panel, such as when a customer is shopping for furniture, or the like.

Other embodiments may include an incorporation of influencers using the system, but in a conspicuous fashion, in order for a business to have an influencer give an opinion as to a particular product and/or service and seek to influence other users of the system 10 to purchase the product and/or service, or to do the opposite if the product and/or service happens to be offered by a competitor to the business.

Embodiments may be available on or through the internet, such as through domain names reserved and owned by Applicant that include Poll-Time.com, SurveySlant.com, OpinionMuse.com, PollMuse.com, and FriendlyMuse.com.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An opinion aggregation system comprising:
a server having a memory storing user information; and
a first user computing device and other user computing devices coupled to the server, wherein the server is programmed to:
receive and store an opinion request from the first user computing device;
automatically process the opinion request utilizing artificial intelligence software to identify elements of the opinion request and search for similar prior requests;
automatically aggregate prior opinions to the similar prior requests and deliver the aggregated prior opinions and a start new poll button for display on the first user computing device; and
in response to selection of the start new poll button on the first user computing device, automatically deliver the opinion request with response elements to the other user computing devices for display and entering an opinion.

2. The opinion aggregation system of claim 1, wherein the server is further programmed to receive and store the opinions entered by the other user computing devices; and automatically deliver the received opinions entered by the other user computing devices for display on the first user computing device.

3. The opinion aggregation system of claim 2, wherein the response elements comprise selection elements, text entry elements or a combination of selection elements and text entry elements.

4. The opinion aggregation system of claim 2, wherein the server is further programmed to generate a filter interface and send the filter interface to the first user computing device for display on the first user computing device in response to a selection of a filters button prior to sending the opinion request.

5. The opinion aggregation system of claim 4, wherein the server is further programmed to receive filter selections from the first user computing device and automatically process the filters as part of the opinion request.

6. The opinion aggregation system of claim 5, wherein automatically delivering the opinion request further comprises the server being programmed to automatically deliver the opinion request to a portion of the other user computing devices corresponding to a demographic of users that meet the filter criteria.

\* \* \* \* \*